(12) United States Patent
Tahara

(10) Patent No.: US 12,498,667 B2
(45) Date of Patent: Dec. 16, 2025

(54) LIGHT INTERFERENCE GENERATOR AND HOLOGRAM RECORDING DEVICE

(71) Applicant: National Institute of Information and Communications Technology, Tokyo (JP)

(72) Inventor: Tatsuki Tahara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 325 days.

(21) Appl. No.: 18/552,509

(22) PCT Filed: Feb. 28, 2022

(86) PCT No.: PCT/JP2022/008425
§ 371 (c)(1),
(2) Date: Sep. 26, 2023

(87) PCT Pub. No.: WO2022/209518
PCT Pub. Date: Oct. 6, 2022

(65) Prior Publication Data
US 2024/0192637 A1    Jun. 13, 2024

(30) Foreign Application Priority Data
Mar. 29, 2021   (JP) ................ 2021-056121

(51) Int. Cl.
| G03H 1/04 | (2006.01) |
| G03H 1/06 | (2006.01) |
| G03H 1/26 | (2006.01) |

(52) U.S. Cl.
CPC ............ *G03H 1/0443* (2013.01); *G03H 1/06* (2013.01); *G03H 1/2645* (2013.01);
(Continued)

(58) Field of Classification Search
CPC ...... G03H 1/0443; G03H 1/06; G03H 1/2645; G03H 2001/0458; G03H 2222/31;
(Continued)

(56) References Cited

U.S. PATENT DOCUMENTS 10,108,145 B2   10/2018   Awatsuji et al.
2007/0247635 A1*  10/2007  Kruger .................. G02B 21/18
356/495
(Continued)

FOREIGN PATENT DOCUMENTS

| JP | 2017076038 A | 4/2017 |
| JP | 6245551 B2 | 12/2017 |

(Continued)

OTHER PUBLICATIONS

International Search Report and Written Opinion for PCT/JP2022/008425, mailed May 17, 2022.
(Continued)

*Primary Examiner* — Arnel C Lavarias
(74) *Attorney, Agent, or Firm* — GRUMBLES LAW PLLC; Brittany Haanan

(57) ABSTRACT

A hologram recording device includes an image sensor and a light interference generator that is attached to an imaging surface of the image sensor. The light interference generator is configured to generate two light waves whose phases are different from each other from an incident object light, and the image sensor is configured to record interference fringes that are formed from the two light waves as a hologram. The light interference generator includes a first birefringent material, a phase shifter array configured to spatially divide a polarization component whose polarization direction is parallel to or orthogonal to an optic axis of the first birefringent material to change a phase difference in two or more ways, and a polarizer whose transmission axis is in a
(Continued)

direction that is inclined with respect to the optic axis of the first birefringent material. The first birefringent material, phase shifter array, and polarizer are arranged in this order starting from a side of incidence of light.

8 Claims, 8 Drawing Sheets

(52) U.S. Cl.
CPC . *G03H 2001/0458* (2013.01); *G03H 2222/31* (2013.01); *G03H 2223/20* (2013.01); *G03H 2223/22* (2013.01); *G03H 2225/32* (2013.01)

(58) Field of Classification Search
CPC .......... G03H 2223/20; G03H 2223/22; G03H 2225/32; G03H 1/00; G03H 1/0005; G03H 2001/005; G03H 1/02; G03H 2001/0208; G03H 2001/0216; G03H 2001/0224; G03H 2001/0228; G03H 1/04; G03H 2001/0436; G03H 2001/0441; G03H 2001/0447; G03H 2222/13; G03H 2222/14; G03H 2223/13; G02B 5/28
USPC ......... 359/11, 1, 10, 21, 30, 31, 34, 35, 577, 359/580; 430/1, 2
See application file for complete search history.

(56) References Cited

U.S. PATENT DOCUMENTS

| | | | |
|---|---|---|---|
| 2015/0205260 A1 | 7/2015 | Awatsuji et al. | |
| 2016/0011564 A1* | 1/2016 | Tanabe | G03H 1/0443 359/11 |
| 2017/0242398 A1* | 8/2017 | Brooker | A61B 3/13 |
| 2022/0349755 A1* | 11/2022 | Tahara | G01J 3/0224 |

FOREIGN PATENT DOCUMENTS

| | | |
|---|---|---|
| JP | 6308594 B2 | 4/2018 |
| JP | 2019219523 A | 12/2019 |

OTHER PUBLICATIONS

Tahara, "Development of Instantaneous Color Holography System for Sensing Fluorescence and White Light", English Press Release published by JST and available online at https://www.jst.go.jp/pr/announce/20200722-2/pdf/20200722-2.pdf, pp. 1-6, 2020.

Tahara, "Natural light color multiplex holographic imaging method" (English Translated); presentation video for New Technology Presentation Meetings for JST Strategic Basic Research Programs (Fiscal Year 2020); https://www.youtube.com/watch?v=IKHnXLi5z0c.

Tahara, et al., "Incoherent color digital holography with computational coherent superposition for fluorescence imaging", Applied Optics, vol. 60 No. 4, pp. A260-A267, 2021.

Tahara, et al., "Multiwavelength-three dimensional microscopy with spatially incoherent light, based on computational coherent superposition", Optics Letters, vol. 45, Issue 9, pp. 2482-2485, 2020.

Tahara, et al., "Single-shot incoherent color digital holographic microscopy system with static polarization-sensitive optical elements", Journal of Optics (IOP Publishing), vol. 22, No. 10, 105702, 2020.

Tahara, et al., "Single-shot phase-shifting incoherent digital holography", Journal of Optics (IOP Publishing), vol. 19, No. 6, 065705, 2017.

Tahara, et al., "Single-shot wavelength-multiplexed digital holography for 3D fluorescent microscopy and other imaging modalities", Applied Physics Letters, vol. 117, Issue 3, 031102, 2020.

Tahara, et al., "Two-step phase-shifting interferometry for self-interference digital holography", Optics Letters, vol. 46, Issue 3, pp. 669-672, 2021.

T. Tahara, "Natural light color multiplex holographic imaging method", presentation material for New Technology Presentation Meetings for JST Strategic Basic Research Programs that is available online from site of Japan Science and Technology Agency (JST), pp. 1-26, Fiscal Year 2020.

* cited by examiner

LIGHT INTERFERENCE GENERATOR AND HOLOGRAM RECORDING DEVICE

TECHNICAL FIELD

The present invention relates to a light interference generator and a hologram recording device equipped with the light interference generator.

BACKGROUND ART

Information on optical characteristics such as wavelength and polarization of light is utilized in various forms and ways. The information is used as useful feature quantities for identifying molecular composition with optical microscopes including fluorescence microscopes, acquiring various information on cells, such as orientation and localization of biopolymers, without staining, obtaining vital signs showing the health status of a living organism, estimating the state of degradation of a product or material, identifying types and characteristics of a substance or material, identifying and recognizing an object with the naked eye or by robot vision. A digital holography technique has been disclosed that contrasts with the conventional technique in which multiple cameras are arranged to obtain optical information of a specimen (object) in three dimensional space. The digital holography technique performs multiplex recording of a hologram by a single image sensor and reproduces a three dimensional image from the obtained multiplex hologram through signal processing. With the digital holography technique, generating two light waves that are used for forming an interference fringe that becomes a hologram with incoherent light enables the use of natural light as a light source or the recording of light emitted from a self-emitting specimen (Patent Literatures 1-3 and Non-Patent Literatures 1-5). In particular, a hologram recording device can be made compact by using a single-path system in which two light waves whose radii of curvature are different from each other are generated over a single optical path (Patent Literature 3 and Non-Patent Literatures 1 to 5).

In Non-Patent Literatures 1 and 2, a polarization-sensitive dual-focus lens such as a birefringent lens is used to generate light waves with different radii of curvature from linearly polarized lights that are orthogonal to each other. After the phase of one of the light waves is shifted with a polarization-sensitive phase modulator, the polarized components of the two light waves are aligned to form an interference fringe with a polarizer whose transmission axis is in a diagonal direction. Further, the phase modulator is electrically driven to change the amount of the phase shift to obtain a time-dispersed multiplex hologram. Non-Patent Literature 1 further discloses forming a plurality of narrow-band lights in R, G, and B wavelength ranges by a multi-band pass filter, thus changing temporally incoherent light, such as natural light, to temporally partially coherent light. In this way, images can be reproduced for each wavelength range from a multiplex hologram that is recorded by a monochromatic image sensor.

Patent Literature 3 and Non-Patent Literatures 3 and 4 discloses using a phase shifter array, in which polarization-sensitive phase shifters such as a liquid-crystal spatial light modulator are arranged, to generate light waves having different radii of curvature with linearly polarized lights that are orthogonal to each other and also to shift the phase of one of the light waves. The light waves are then sequentially passed through a quarter-wave plate and a polarizer array to simultaneously generate four sets of light waves with phase shift amounts of 0, $\pi/2$, $\pi$, and $3\pi/2$. Imaging is performed by one exposure. Non-Patent Literature 4 also discloses performing imaging with a color image sensor provided with a color filter array of R, G, and B color filters so that it is also possible to obtain wavelength (color) information. Non-Patent Literature 5 discloses generating two light waves having different radii of curvature from linearly polarized lights that are orthogonal to each other with a polarization-sensitive bifocal lens such as a birefringent lens, and shifting the phase of one of the light waves with a polarization-sensitive phase shifter array so that the phase of one of the light waves is shifted by a shift amount that differs for each cell (phase shifter) and each wavelength. Then, the polarization components of the two light waves are aligned with a polarizer whose transmission axis is in a diagonal direction to form interference fringes, and multiplex recording of interference fringes of light of each of the colors R, G, and B is performed with a monochromatic image sensor.

CITATION LIST

Patent Literature

Patent Literature 1: Japanese Patent No. 6308594
Patent Literature 2: Japanese Unexamined Patent Application Publication No. 2017-076038
Patent Literature 3: Japanese Patent No. 6245551

Non-Patent Literature

Non-Patent Literature 1: T. Tahara, et al., "Multiwavelength three dimensional microscopy with spatially incoherent light, based on computational coherent superposition", Optics Letters, Volume 45, Issue 9, pp. 2482-2485, 2020
Non-Patent Literature 2: T. Tahara, et al., "Two-step phase-shifting interferometry for self-interference digital holography", Optics Letters, Volume 46, Issue 3, pp. 669-672, 2021
Non-Patent Literature 3: T. Tahara, et al., "Single-shot phase-shifting incoherent digital holography", Journal of Optics (IOP Publishing), Volume 19, Number 6, 065705, 2017
Non-Patent Literature 4: T. Tahara, et al., "Single-shot incoherent color digital holographic microscopy system with static polarization-sensitive optical elements", Journal of Optics (IOP Publishing), Volume 22, Number 10, 105702, 2020
Non-Patent Literature 5: T. Tahara, et al., "Single-shot wavelength-multiplexed digital holography for 3D fluorescent microscopy and other imaging modalities", Applied Physics Letters, Volume 117, Issue 3, 031102, 2020

SUMMARY OF INVENTION

Technical Problem

In the techniques disclosed in Patent Literature 3 and Non-Patent Literatures 1-5, a distance is required between an optical element, such as a bifocal lens that is made of a birefringent material and is used for generating light waves for forming interference fringes, and an imaging surface of the image sensor. There is thus a need for further compactness. In addition, optical loss due to Fresnel reflection at an interface with air that is between optical elements or between an optical element and the image sensor may cause a decline in utilization efficiency of light. This may darken an image reproduced from the obtained multiplex hologram with respect to object light. There is therefore room for improvement in these techniques.

An object of the invention is to provide a compact hologram recording device for obtaining a multiplex hologram for reproducing a bright, three-dimensional image that includes information on an optical characteristic such as a wavelength, and a light interference generator for generating light waves that form interference fringes of a multiplex hologram.

Solution to Problem

A light interference generator according to the present invention includes a first birefringent material, a phase modulator configured to spatially, temporally, or spatially and temporally divide a polarization component whose polarization direction is parallel to or orthogonal to an optic axis of the first birefringent material to change a phase difference in two or more ways, and a polarizer whose transmission axis is in a direction that is inclined with respect to the optic axis of the first birefringent material. The first birefringent material, phase modulator, and polarizer are arranged without a gap along a direction of travel of light. The polarizer is disposed closer to a light exit side than the first birefringent material and the phase modulator.

Another light interference generator according to the present invention is configured so that a surface of exit of light thereof is attached to a surface of incidence of light of an image sensor and includes a first birefringent material and a polarizer array that includes a two dimensional arrangement of a plurality of polarizers whose transmission axes are in different directions to each other. The first birefringent material and the polarizer array are arranged without a gap in this order starting from a side of incidence of light.

A hologram recording device according to the present invention includes an image sensor and either of the light interference generator described above. The light interference generator is attached to the surface of incidence of light of the image sensor. The light interference generator is configured to generate two light waves whose phases are different from each other from an incident light wave. The image sensor is configured to record interference fringes that are formed from the two light waves as a hologram.

Advantageous Effects of Invention

According to a light interference generator and a hologram recording device that is in accordance with the present invention, a compact device can be achieved and a bright image can be reproduced from a hologram obtained from a self-luminous subject or without increasing illumination light to the subject.

DESCRIPTION OF EMBODIMENTS

Figure 1:
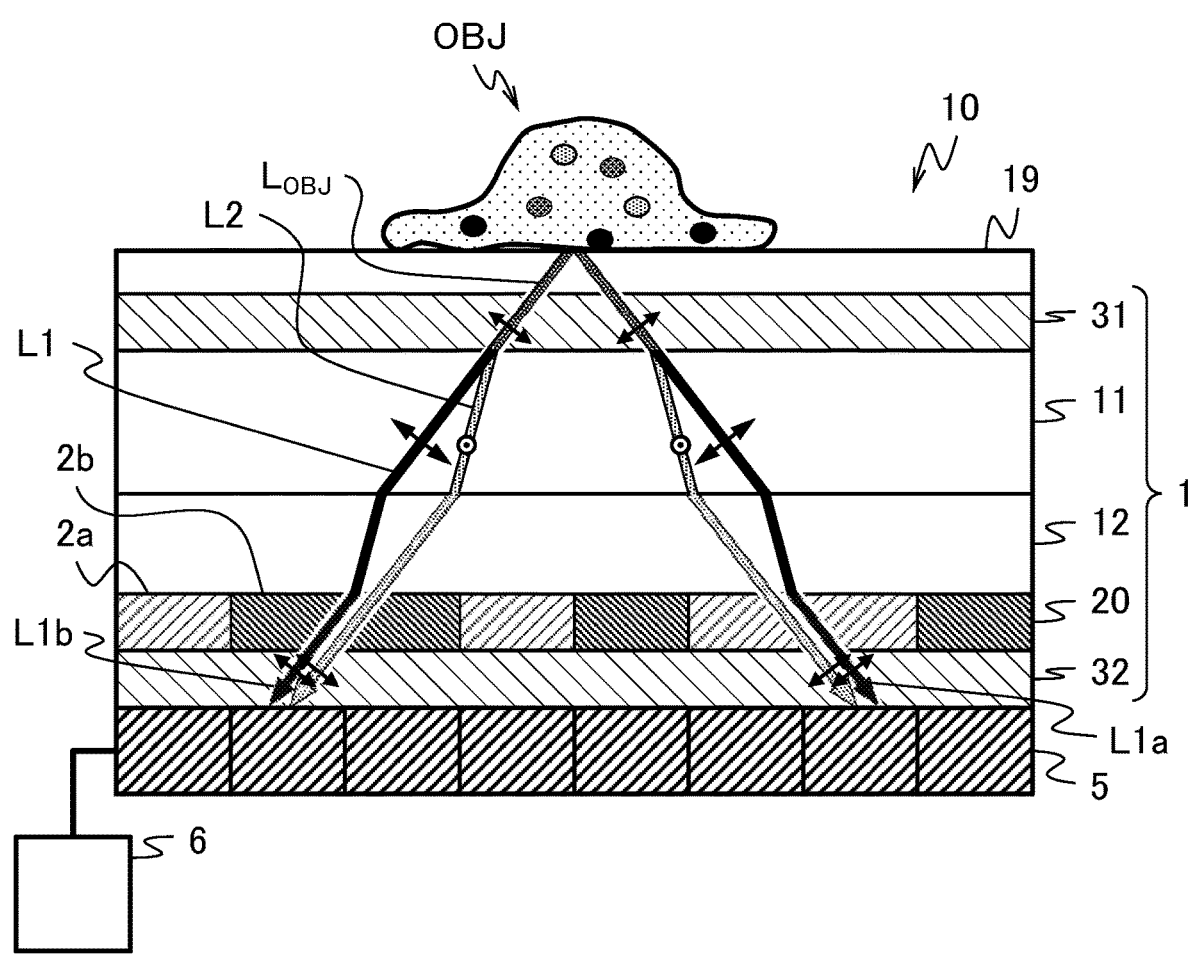
FIG. 1 is a sectional view schematically illustrating a configuration of a hologram recording device that includes a light interference generator according to a first embodiment of the present invention.

An embodiment for implementing a light interference generator and a hologram recording device according to the present invention will be described with reference to the drawings. A light interference generator according to the present invention is an optical component that is mounted on an imaging surface of an image sensor to make up a hologram recording device. A hologram recording device according to the present invention may be applied to a digital holographic microscope, a three-dimensional image analyzing apparatus, a digital holography apparatus, and the like. Apparatus and elements thereof shown in the drawings may be exaggerated in size, location, or the like and simplified in shape for clarity of description. Some elements are not patterned in the sectional views. In the following description, the same or similar elements are denoted by the same reference signs and the description thereof may be omitted.

First Embodiment

As shown in FIG. 1, the hologram recording device 10 according to a first embodiment of the present invention includes an image sensor 5 and a light interference generator 1 that is mounted on a surface of incidence of light (an imaging surface) of the image sensor 5, and may include a light source (not shown) if necessary. Here, the hologram recording device 10 further includes a computer 6 for driving and controlling the image sensor 5 and a cover 19 made of a glass plate or the like for covering a surface of incidence of light of the light interference generator 1. An object OBJ that is subject of the hologram recording device 10 is placed on the cover 19. Depending on the object OBJ, the hologram recording device 10 may include a glass cell for accommodating the object OBJ and may further include a rotation mechanism for rotating the glass cell in two or three axial directions. The hologram recording device 10 forms a self-interference interferometer that has an in-line optical system. When light (alight wave) $L_{OBJ}$ from the object OBJ is incident on the light interference generator 1, said generator 1 generates two light waves whose phases are different from each other, and the image sensor 5 records interference fringes formed by these two light waves as a hologram. Referring to the two light waves that form interference fringes as a set, the light interference generator 1 generates two or more sets of light waves simultaneously, and the image sensor 5 may record a multiplex hologram through one exposure as will be described later.

In the hologram recording device 10, the light interference generator 1 is mounted on the imaging surface (surface of incidence of light) of the image sensor 5. The light interference generator 1 according to the first embodiment of the present invention includes the following parts that are arranged in the following order starting from a side on which light is incident: a first birefringent material 11; a phase shifter array (phase modulator) 20 that spatially divides a polarization component whose polarization direction is parallel to or perpendicular to an optic axis of the first birefringent material 11 to change a phase difference in two or more ways; and a polarizing plate (polarizer) 32 whose transmission axis is inclined with respect to an optic axis of the first birefringent material 11. In one or more embodiments, the light interference generator 1 further includes a second birefringent material 12 whose optic axis is orthogonal to the optic axis of the first birefringent material 11 and is connected to a surface of exit of light of the first birefringent material 11, in other words, between the first birefringent material 11 and the phase shifter array 20. In one or more embodiments, the light interference generator 1 further includes a polarizing plate 31 on a light incidence side of the first birefringent material 11. The polarizing plate 31 is configured so that a transmission axis thereof is inclined with respect to the optic axis of the first birefringent material 11. The light interference light generator 1 is configured so that these components (optical elements) form layers without gaps. Further, the light interference generator 1 may be provided with an anti-reflection film (AR coating) made of a dielectric multilayer film on an upper surface or a lower surface of any of these components. In one or more embodiments, an AR coating may be provided between components with a large difference in refractive index. The anti-reflection coating suppresses Fresnel reflection at an interface between components and further reduces light loss. In one or more embodiments, each component is in a form of a plate of a predetermined, uniform thickness and is configured with dimensions that is greater than or equal to the imaging surface of the image sensor 5 in plan view (surface of incidence of light). The light interference generator 1 can increase a maximum spread angle of the object light $L_{OBJ}$ when its whole thickness, in other words, a path length (geometric distance) of light in the normal direction to the surface of incidence of light, is smaller with respect to a length of one side of the imaging surface of the image sensor 5.

The hologram recording device 10 is configured so that there is no gap (air) from the upper surface of the cover 19, which is a mounting surface of the object OBJ, to the imaging surface of the image sensor 5. For this reason, in one or more embodiments, the surface of incidence of light of the light interference generator 1 is horizontal. Further, as described above, since the components that make up the light interference generator 1 are in the form of a plate, the image sensor 5 is disposed so that the imaging surface faces upward and is horizontal. Regarding the light interference generator 1, because light enters from an upper surface and travels downward in the light interference generator 1, in the present embodiment, the incidence side of light is on an upper side. Because the light interference generator 1 does not include a lens that acts as a magnifying optical system, the hologram recording device 10 uses as its subject an object OBJ whose dimensions fit within the image sensor 5 in plan view (surface of incidence of light).

Light Source

Light from the object OBJ (object light) $L_{OBJ}$ is visible light and natural light with a random polarization direction (non-polarized light). In one or more embodiments, the object light $L_{OBJ}$ is not coherent light. As a light source for irradiating the object OBJ with light in order to generate the object light $L_{OBJ}$, a general illumination device, such as a white light-emitting diode (LED), a fluorescent lamp, a halogen lamp or a mercury lamp, or sunlight may be used. Alternatively, a light source combining monochromatic light sources such as LEDs of respective colors of red (R), green (G) and blue (B) may be used, in which case a multiplex hologram that is capable of reproducing an image with high color reproducibility may be obtained. Alternatively, a fluorescent material including an autofluorescencing material, Raman-scattered light which is naturally emitted, or a self-luminous material including a bioluminescent material which emits light without requiring a light source may be used as the light source and also be used as the object OBJ. Therefore, the hologram recording device 10 may be applied to a digital holographic microscope for observing a fluorescent material or self-luminous material. When a fluorescent material is used as an object OBJ, a light source is provided for irradiating light (excitation light) that simultaneously excites a plurality of fluorescent materials having different emission colors contained in the object OBJ (see a modification example shown in FIG. 4). As described above, the hologram recording device 10 includes the above-described light source as required. In the hologram recording device 10, the arrangement of the light source is not particularly specified. For example, the light source may be arranged in the same manner as a light source for irradiating a subject (object OBJ) in a general optical microscope. Here, as an example, the hologram recording device 10 is configured for an object OBJ that is a self-luminous material and is configured without a light source. Because of this, the hologram recording device 10 is provided with a housing (not shown) that shields the device from external light.

Image Sensor

The image sensor 5 converts incident light into an electric signal for each of the two dimensionally arranged pixels and outputs the electric signal. In the hologram recording device 10 according to the present embodiment, a monochromatic (monochrome) image sensor having sensitivity to light in the R, G, and B wavelength ranges that are included in the $L_{OBJ}$ from the object OBJ is used as the image sensor 5 so that light in each of the R, G, and B wavelength ranges is imaged without distinction. An image sensor installed in a general digital microscope may be used as the image sensor 5. Specific examples of such an image sensor include a Complementary Metal-Oxide Semiconductor (CMOS) image sensor or a Charge Coupled Device (CCD) image sensor in which photodiodes made of Silicon that has a wide spectral sensitivity including a visible region are included as pixels. Alternatively, an array of commercially available photodetectors such as an electron multiplier may be used as the image sensor 5.

Computer

The computer 6 incorporates a controller for driving and controlling the image sensor 5 and a non-transitory storage device for storing a hologram obtained by the image sensor 5, and includes a central processing unit (CPU) and memory such as a read-only memory (ROM), a random-access memory (RAM), or a flash memory. A commercially available personal computer (PC) or the like may be used as the computer 6. Alternatively, the computer 6 may be configured as a camera module that is integrated with the image sensor 5 and the light interference generator 1. In this case, the computer 6 may be configured from a circuit board whose shape in plan view is similar to that of the image sensor 5 and be disposed under the image sensor 5 (see FIG. 3) or the computer 6 may be formed on the same silicon substrate as that of the CMOS image sensor or the like constituting the image sensor 5.

First Birefringent Material, Second Birefringent Material

The first birefringent material 11 and second birefringent material 12 are each made of a birefringent material and are optical elements that, together, are configured to generate two optical waves L1 and L2 from the object light $L_{OBJ}$. Examples of the birefringent material include crystals such as quartz, β-Barium borate ($BaB_2O_4$, BBO) crystal, α-BBO crystal, calcite ($CaCO_3$), rutile ($TiO_2$) crystal, and yttrium vanadate ($YVO_4$) crystal, a metamaterial, and a material having structural birefringence such as photonic crystal. Alternatively, a gradient index (GRIN) lens having birefringence using liquid crystal may be applied to the birefringent materials 11 and 12. An optic axis of the first birefringent material 11 is arranged to extend along a direction of the surface of incidence of light. In the present embodiment, the direction of the optic axis of the first birefringent material 11 is defined to extend along a 90° direction (a direction perpendicular to the sheet surface in FIG. 1). Of the object light $L_{OBJ}$, light that is incident at an angle with respect to the surface of incidence is separated by the first birefringent material 11 into an ordinary ray and an extraordinary ray that are each refracted at an angle according to a corresponding refractive index, thereby generating light waves L1 and L2. Here, the ordinary ray is linearly polarized light that is polarized at 0° (a left to right or right to left direction in FIG. 1) and the extraordinary ray is linearly polarized light that is polarized at 90°. Here, the optical axis of the first birefringent material 11 is a slow axis. Therefore, the light wave L1 which is the ordinary ray has a larger angle of refraction than the light wave L2. The second birefringent material 12 is disposed so that its optic axis (slow axis) is oriented in a 0° direction. Therefore, the second birefringent material 12 causes the light wave L2, which is linearly polarized light that is polarized at 90°, to travel as an ordinary ray with a greater angle of refraction compared with that of the light wave L1.

Two light waves L1 and L2 that are spherical waves having different radii of curvature from each other are generated from the object light $L_{OBJ}$ by the first birefringent material 11 and the second birefringent material 12. With the two layers of birefringent materials 11 and 12 whose optical axes are orthogonal to each other, the light interference generator 1 is able to generate two light waves L1 and L2 for suitably forming interference fringes. The first and second birefringent materials 11 and 12 are configured so that the total optical path lengths (optical path lengths) of the light waves L1 and L2 across these two layers and the phase shifter array 20 with polarization-sensitivity are sufficiently different from each other. Details will be provided later in the description of the phase shifter array 20. It should be noted that the birefringent materials 11 and 12 may be made thinner when the difference between the refractive index of ordinary ray and the refractive index of extraordinary ray is larger (birefringence is stronger).

Phase Shifter Array

The phase shifter array 20 is a phase modulator that spatially divides one of linearly polarized light that is polarized at 0° or linearly polarized light that is polarized at 90° to change a phase difference in N ways (N≥2). For this purpose, the phase shifter array 20 is configured to include a two-dimensional array of randomly arranged N types of phase shifters that shift a phase of said one of linearly polarized light by different shift amounts. With such a phase shifter array 20, the light interference generator 1 forms N patterns of interference fringes. The number of interference fringe patterns is set according to the number of holograms that are required based on optical information to be obtained for the object OBJ, an image reproduction method, or the like, and the phase shifter array 20 is designed based on this number of interference fringe patterns. Here, for simplicity, N is equal to 2 and the phase shifter array 20 includes phase shifters 2a and 2b and shifts the phase for linearly polarized light that is polarized at 0°. That is, the phase shifter array 20 changes the light wave L1 into light waves L1*a* and L1*b* of different phases for each cell (phase shifter). In one or more embodiments, each of the cells 2a and 2b of the phase shifter array 20 provides a phase distribution of a spherical wave with no turn-back. By providing the phase distribution of a spherical wave with no turn-back, the phase shifter array 20 is provided with a function of a lens, and because light waves of an unnecessary order are not generated, higher light utilization efficiency can be obtained compared to using a diffractive lens. in one or more embodiments, the phase shifter array 20 is arranged so that the number of phase shifter 2a and the number of phase shifter 2b are equal or close. With such configuration, the light wave L1*a* and light wave L1*b* are equal in intensity (an intensity ratio is 1:1) or have intensities that are close to each other. In one or more embodiments, the number of cells of the phase shifter array 20 is equal to or less than the number of pixels of the image sensor 5. In one or more embodiments, the number of cells of the phase shifter array 20 is equal (same array) to the number of pixels.

In the present embodiment, the phase shifter 2a and phase shifter 2b each shifts a phase by a shift amount corresponding to a wavelength. Specifically, the phase is shifted by a shift amount for each wavelength range of colors R, G, and B. As the phase shifter array 20 in which the phase shifters 2a and 2b having polarization sensitivity and wavelength dependence are arranged, a photonic crystal in which a long microwave plate is arranged or an optical element in which a structural birefringent medium having a subwavelength periodic structure is arranged may be used. Alternatively, a transmission-type liquid-crystal spatial light modulator that is used in a liquid crystal display (LCD) or the like may be applied to be used as the phase shifter array 20, and by applying a voltage having a different magnitude for each cell, a phase shifter having a phase shift amount corresponding to the magnitude of the voltage may be arbitrarily arranged.

Here, d1 represents a thickness of the first birefringent material 11, $n1_o$ represents a refraction index for the ordinary ray of the first birefringent material 11, and $n1_e$ represents a refraction index for the extraordinary ray of the first birefringent material 11. Further, d2 represents a thickness of the second birefringent material 12, $n2_o$ represents a refraction index for the ordinary ray of the second birefringent material 12, and $n2_e$ represents a refraction index for the extraordinary ray of the second birefringent material 12. Further, $d_{PS}$ represents a thickness of the phase shifter array 20 (in the case where the phase shifter array 20 is a liquid-crystal spatial light modulator, a thickness of the liquid crystal layer), $n_{PSo}$ represents a refractive index of the ordinary ray for the phase shifter array 20, and $n_{PSe}$ represents a refractive index of the extraordinary ray for the phase shifter array 20.

When an optical path length in the normal direction to the surface of incidence of light is approximately obtained, the optical path length of the light wave L1 is represented by $(n1_o d1 + n2_e d2 + n_{PSe} d_{PS})$ and the optical path length of the light wave L2 is represented by $(n1_e d1 + n2_o d2 + n_{PSo} d_{PS})$. The material and thickness of the birefringent materials 11 and 12 are designed so that a difference in the optical path lengths between the light waves L1 and L2 is within an appropriate range that enables the light waves L1 and L2 to form an interference fringe on the imaging surface of the image sensor 5. Specifically, for example, the optical path length difference between the light wave L1 and light wave L2 is adjusted so that an interference fringe is formed in at least one pixel of the image sensor 5. A calculation formula of a coherence length may be used for setting the optical path length difference, and if the optical path length difference is adjusted to be within a calculated value, a clear fringe can be formed. In the present embodiment, the optical path length of the light wave L1 is longer than that of the light wave L2.

Polarizing Plate

The polarizing plate 32 converts the linearly polarized light that is polarized at 0° and the linear polarized light that is polarized at 90° that have been separated by the first birefringent material 11 into linearly polarized light having the same polarization component. For this purpose, the polarizing plate 32 is arranged so that a transmission axis is inclined with respect to the optical axes of the first birefringent material 11 and second birefringent material 12, that is, in a direction other than 0° or 90°. Such a polarizing plate 32 allows interference between the light wave L1 (L1a, L1b) and light wave L2. In one or more embodiments, the polarizing plate 32 causes a 0° polarization component and a 90° polarization component of light transmitted through the polarizing plate 32 to be of the same intensity or to be of intensities that are closer, and therefore, when the light wave L1 and the light wave L2 before entering the polarizing plate 32 have the same intensity, the transmission axis is preferably in a 45° direction or 135° direction. In the present embodiment, the transmission axis of the polarizing plate 32 is set in the 45° direction. When an intensity ratio of the two light waves forming the interference fringe is 1:1 or closer to 1:1, a clean interference fringe is formed and the calculation for reproducing an image from the obtained hologram is simplified. The polarizing plate 31 is provided as necessary to control the intensity ratio of the linearly polarized light that is polarized at 0° and linearly polarized light that is polarized at 90° that the non-polarized object light $L_{OBJ}$ is split into by the first birefringent material 11. For this reason, in one or more embodiments, a transmission axis of the polarizing plate 31 is disposed in a direction other than 0° or 90°. In one or more embodiments, the transmission axis of the polarizing plate 31 is in a 45° direction or a 135° direction to make the intensity ratio 1:1. In the present embodiment, the transmission axis of the polarizing plate 31 may be disposed in the same 45° direction as the polarizing plate 32.

Hologram Recording Method

Figure 2:
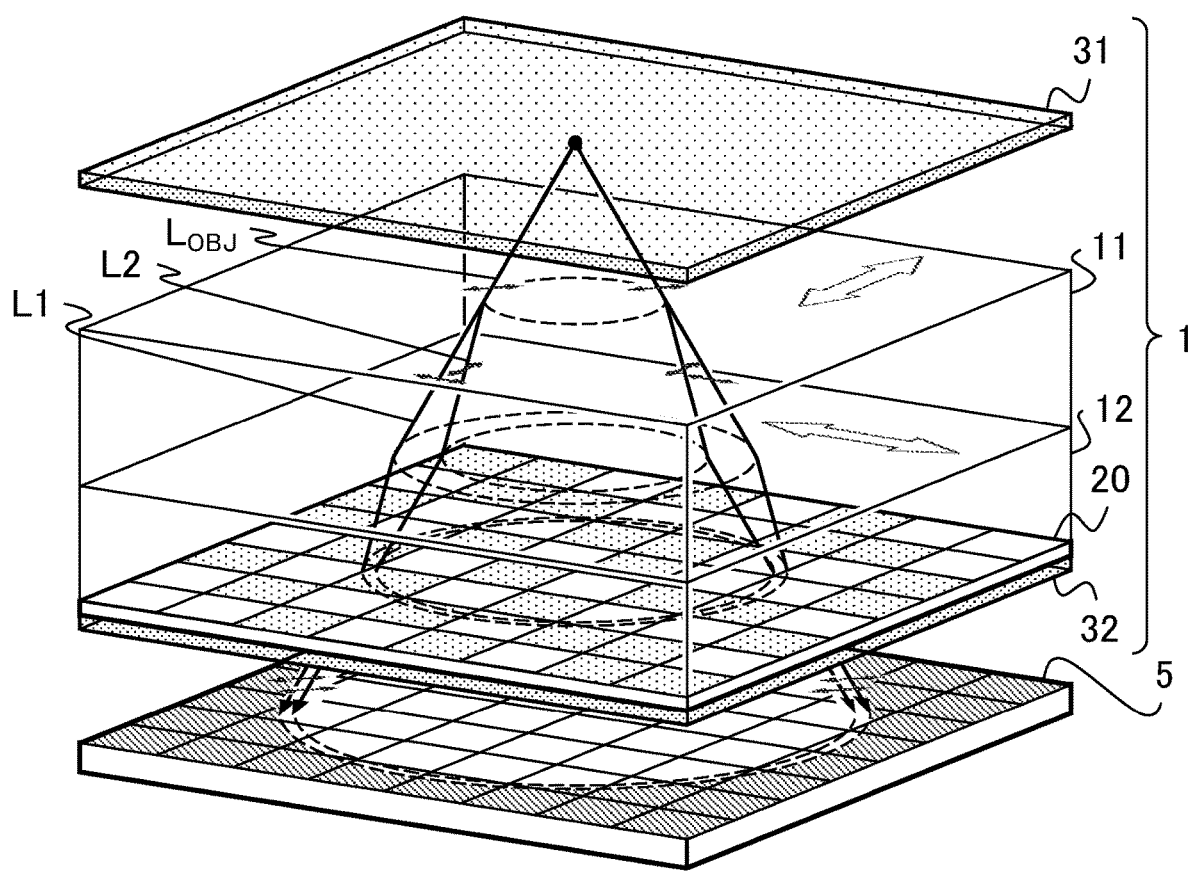
FIG. 2 is an exploded view schematically illustrating a configuration of a light interference generator according to the first embodiment of the present invention.

A hologram recording method of the hologram recording device 10 will be described with reference to FIGS. 1 and 2. FIGS. 1 and 2 show light $L_{OBJ}$ from an object OBJ that spreads out in all directions from the center of the surface of incidence and enters the light interference generator 1. In the drawings, a light ray is represented by a thick arrow and linearly polarized light is represented with a double-headed arrow indicating a polarization direction. In the sectional views of FIG. 1 and a later-described modified example, linear polarization of 45° is represented by a double-headed arrow that is shorter than a linear polarization of 0°, and a linear polarization of 90° (in a direction perpendicular to the surface of the sheet) is represented by a white circle (O) and a dot (•) at the center of the white circle. Further, in FIG. 2, white, double-headed arrows indicating the directions of optic axes of the birefringent materials 11 and 12 are shown.

The object light $L_{OBJ}$ generated from the object OBJ is incoherent and non-polarized light, but becomes linearly polarized light that is polarized at 45° after passing through the polarizing plate 31. When the object light $L_{OBJ}$ that has been linearly polarized at 45° is incident on the first birefringent material 11, apart from light that is incident perpendicularly to the surface of incidence, the object light $L_{OBJ}$ is split into a light wave L1 that is linearly polarized at 0° and is an ordinary ray and a light wave L2 that is linearly polarized at 90° and is an extraordinary ray. The light wave L1 and light wave L2 have an intensity ratio of 1:1 and travels with angles of refraction that are mutually different. When the light waves L1 and L2 are emitted from the first birefringent material 11 and are incident on the second birefringent material 12, the light waves L1 and L2 advance with the magnitudes of the angles of refraction switched. Here, with regards to a refractive index of the ordinary ray (light wave L1) of the first birefringent material 11, a refractive index of the ordinary ray (light wave L2) of the second birefringent material 12, and a refractive index of another member, a difference between the connecting members is ignored.

Among the light waves L1 and L2 transmitted through the phase shifter array 20, the light wave L1 which is linearly polarized light that is polarized at 0° changes in phase by a shift amount that is different for each of the cells (phase shifters) 2a and 2b of the phase shifter array 20, and changes into light waves L1a and L1b of different phases. Each of the light waves L1a and L1b forms a spherical wave. Further, the light waves L1a and L1b have different phase differences from the light wave L2 whose phase has not been changed. A phase difference between the light waves L1 and L2 is also caused by a difference in the total optical path length along the birefringent materials 11 and 12 and the phase shifter array 20. Further, since the phase shifters 2a and 2b have wavelength dependence, for each wavelength range of the colors R, G, and B, two light waves are formed having phases changed by two shift amounts. As a result, the phase shifter array 20 changes the light wave L1 into a total of six light waves, two for each wavelength range. The light waves L1a, L1b, and L2 output from the phase shifter array 20 are all polarized by the polarizing plate 32 to become linearly polarized light that is polarized at 45°. At the imaging surface of the image sensor 5, the light wave L1a and light wave L2 of the same wavelength range and the light wave L1b and light wave L2 of the same wavelength range respectively form interference fringes, and two patterns for each of the colors R, G, and B totaling six patterns of interference fringes overlap each other. The image sensor 5 collectively captures an image of these six patterns of interference fringes and records them as a multiplex hologram.

Digital Holography Apparatus

A multi-color, three-dimensional image of the object OBJ may be reproduced by signal processing from the multiplex hologram recorded by the image sensor 5 (Non-Patent Literatures 1-5). A digital holography apparatus may be constructed by incorporating an image reproducing device that executes such signal processing into the computer 6.

Modified Example

The light interference generator 1 may include only the first birefringent material 11 or second birefringent material 12 provided that it can appropriately generate two light waves L1 and L2 for forming interference fringes. With such a configuration, the light interference generator 1 can further reduce optical loss by reducing the number of components and can also be miniaturized. Further, the light interference generator 1 may be made thinner (smaller) by making one of the birefringent materials 11 and 12 a positive crystal and the other a negative crystal. By reducing the thickness of the light interference generator 1, the maximum spread angle of the object light $L_{OBJ}$ may be increased. The light interference generator 1 may also place the phase shifter array 20 above the first birefringent material 11 (between the polarizing plate 31 and the phase shifter array 20) or between the first birefringent material 11 and the second birefringent material 12. However, in one or more embodiments, the distance between the phase shifter array 20 and the image sensor 5 may be closer. Further, the phase shifters 2a and 2b of the phase shifter array 20 may, for example, be a broadband wave plate having no wavelength dependence. Such a configuration may be adopted when wavelength information is not required, such as when an image to be reproduced is monochrome, or when the image sensor 5 is a color image sensor that includes a color filter array 40 (see FIG. 6) over the imaging surface. The same applies for a case when, for example, an image is reproduced only in the near infrared wavelength range. In this case, the hologram recording device 10 includes a near-infrared light source, and optical elements of the light interference generator 1 and the image sensor 5 that support the near-infrared wavelength region are selected.

Modified Example of Hologram Recording Device

Figure 3:
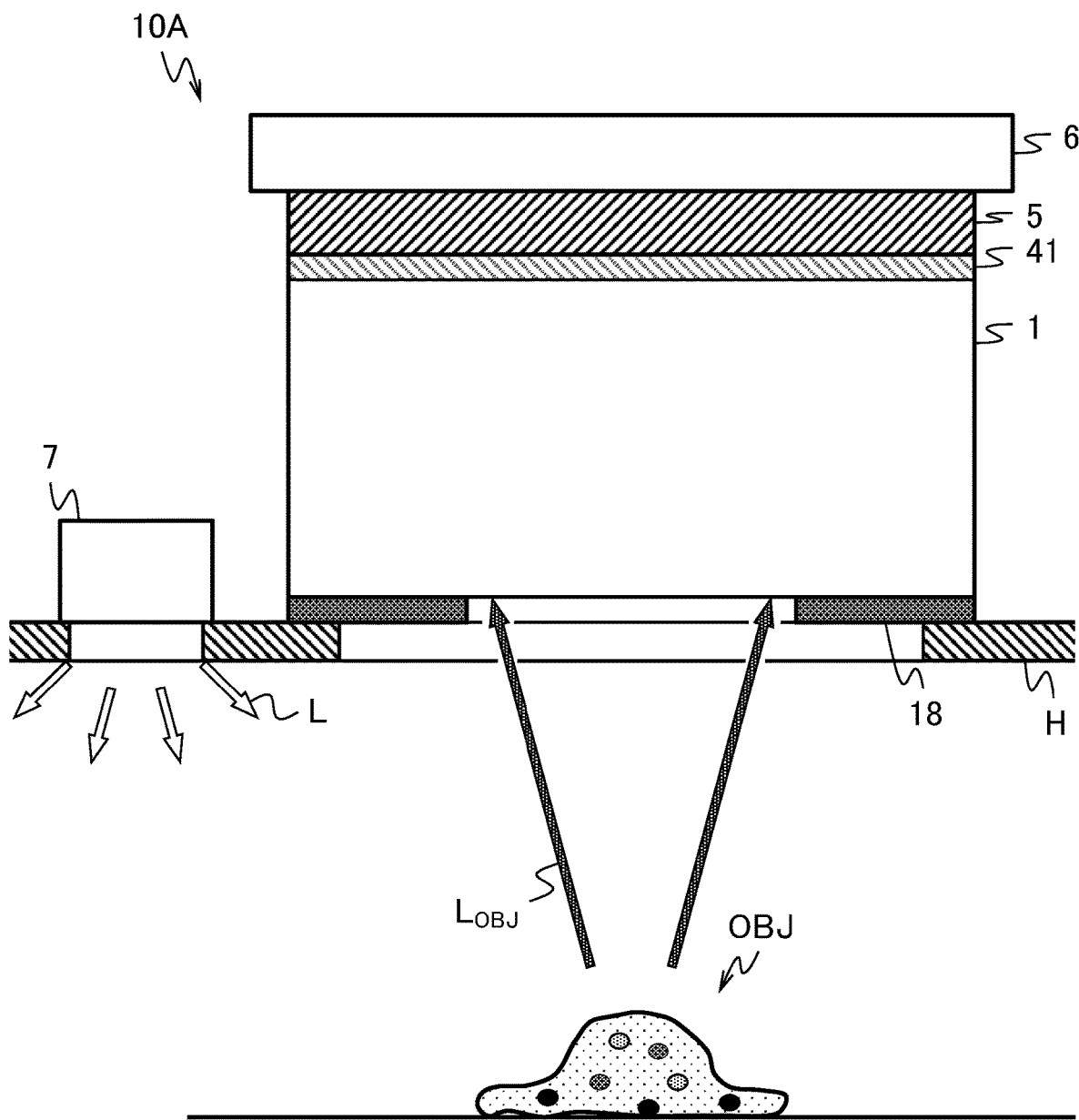
FIG. 3 is a schematic diagram illustrating a configuration of a modification example of a hologram recording device that includes a light interference generator according to the first embodiment of the present invention.

The hologram recording device may be arranged so that the object OBJ is not placed over the surface of incidence of light of the light interference generator 1. Instead, the surface of incidence of the light interference generator 1 may be arranged so as to be separated from the object OBJ and arranged to face the object OBJ from above or from a side. As shown in FIG. 3, in the hologram recording device 10A according to the modification, the light interference generator 1 is disposed above the object OBJ with its surface of incidence of light facing downward. The hologram recording device 10A includes an image sensor 5 and a light interference generator 1, and further includes a light source 7 that emits light L to an object OBJ, a light shielding plate 18 that covers the surface of incidence of light of the light interference generator 1 and has an opening formed therein, a filter 41 that removes light of an unnecessary wavelength range, and a computer 6. The hologram recording device 10A may further include an object lens on a light incidence side of the light interference generator 1. The hologram recording device 10A uses an object OBJ that generates object light $L_{OBJ}$ when irradiated with light L from the outside as a subject. Further, the hologram recording device 10A is, for example, a camera mounted on a smartphone and is provided in a housing H of the smartphone.

Light Source

As described in the above embodiment, the light source 7 is, for example, a white LED. Further, as the light L, in addition to the illumination light from the light source 7, sunlight may be used. Further, as the light L, sunlight may be used in combination with the illumination light from the light source 7. In the hologram recording device 10A, the light source 7 is disposed close to the light interference generator 1 and is arranged so that its surface of exit of light is directed downward in the same manner as the surface of incidence of light of the light interference generator 1. Further, the light source 7 may be turned on by the computer 6 in synchronization with the imaging of the interference fringes by the image sensor 5.

Filter

In the hologram recording device 10A, the light L may include not only the illumination light from the light source 7 but also sunlight or the like. The light L enters the light interference generator 1 together with the object light $L_{OBJ}$. In one or more embodiments, when the image sensor 5 has sensitivity to light outside the visible region, such as infrared light, the image sensor 5 includes a filter 41 for removing light outside the visible region so that such light that is included in sunlight does not enter the image sensor 5. The filter 41 is, for example, an infrared cut-off filter (IRCF) used for a digital camera or the like, a multiple band pass filter for improving coherence, or a filter for blocking out light of a wavelength that is not a target of measurement in order to measure light in a specific wavelength range regardless of visible light or near infrared light. The filter 41 is disposed closer to a light incidence side than the image sensor 5, and in FIG. 3, the filter 41 is disposed between the light interference generator 1 (polarizing plate 32) and the image sensor 5.

Light Shielding Plate

Since the hologram recording device 10A has a certain distance from the object OBJ to the surface of incidence of light of the light interference generator 1, and the object light $L_{OBJ}$ incident on the light interference generator 1 easily spreads widely, in one or more embodiments, the hologram recording device 10A is provided with a light shielding plate 18 over the surface of incidence (over the polarizing plate 31) with the light shielding plate 18 configured with an opening as an aperture. The opening of the light shielding plate 18 is configured to be at the center of the surface of incidence of light and is in the shape of a circle or a polygon that is close to a circle in a plan view. By having an aperture, the spread angles of the object light $L_{OBJ}$ in the light interference generator 1 and the light waves L1 and L2 generated from the object light $L_{OBJ}$ may be suppressed, light having an angle of incidence that cannot be measured may be blocked, and the light waves L1 and L2 may be prevented from reaching the outside of the imaging surface of the image sensor 5.

As shown in FIG. 3, the hologram recording device 10A configured so that the surface of incidence of light of the light interference generator 1 faces the object OBJ from above may include a light-transmitting stage such as a glass plate. The stage is used to place the object OBJ thereon, and the light source 7 may be disposed below the stage.

First Modification

The hologram recording device according to the first embodiment is configured with a light interference generator that includes a phase shifter array for spatially dividing specific linearly polarized light and changing the phase difference into two or more ways to obtain a multiplex hologram. It is also possible to obtain a plurality of holograms by changing the phase difference into two or more ways by temporal division. A hologram recording device according to a first modification of the first embodiment of the present invention will be described below with reference to FIG. 4.

A hologram recording device 10B according to a modification of the first embodiment includes an image sensor 5 and a light interference generator 1B that is mounted on a surface of incidence of light (an imaging surface) of the image sensor 5. The hologram recording device 10B further includes a light source 7A for irradiating an object OBJ with light L, a filter 42 for removing light in an unnecessary wavelength range, a computer 6A for driving and controlling a phase modulation device 21 of the light interference generator 1B and the image sensor 5, and a cover 19 for covering a surface of incidence of light of the light interference generator 1B. In the hologram recording device 10B, when light (light wave) $L_{OBJ}$ from the object (subject) OBJ is incident on the light interference generator 1B, the light interference generator 1B generates two light waves whose phases are different from each other, and the image sensor 5 records interference fringes formed by these two light waves as a hologram. As will be described later, the light interference generator 1B generates two light waves by switching the phase difference between the two light waves repeatedly over time, and the image sensor 5 performs exposure each time the switching is made so that a plurality of holograms may be sequentially recorded.

The hologram recording device 10B is, for example, a fluorescence microscope using a fluorescent substance as an object OBJ. For this purpose, the hologram recording device 10B includes a light source 7A that emits light (excitation light) L that simultaneously excites a plurality of fluorescent substances of different emission colors contained in the object OBJ. Here, the object light (fluorescence) $L_{OBJ}$ is red (R), green (G), and blue (B) light, and the excitation light L is ultraviolet (UV) light.

In the hologram recording device 10B, the light interference generator 1B is mounted on the imaging surface (surface of incidence of light) of the image sensor 5. The light interference generator 1B according to the modification of the first embodiment includes the following parts that are arranged in the following order starting from a side on which light is incident: a first birefringent material 11; a phase modulation device (phase modulator) 21 that temporally divides a polarization component whose polarization direction is parallel to or perpendicular to an optic axis of the first birefringent material 11 to change a phase difference in two or more ways; and a polarizing plate (polarizer) 32 whose transmission axis is inclined with respect to an optic axis of the first birefringent material 11. In one or more embodiments, the light interference generator 1B further includes a second birefringent material 12 whose optic axis is orthogonal to the optic axis of the first birefringent material 11 and a polarizing plate 31, similar to the light interference generator 1 according to the above-described embodiment. That is, the light interference generator 1B has a configuration in which the phase shifter array 20 is replaced with the phase modulation device 21 for the light interference generator 1 (see FIG. 1).

Filter

In the hologram recording device 10B, the excitation light L is irradiated not only on the object OBJ but also on the surface of incidence of light of the light interference generator 1B. When the image sensor 5 has sensitivity in a wavelength region of the excitation light L as well, a filter 42 for removing the excitation light L is provided so that the excitation light L does not enter the image sensor 5. The filter 42 is a bandpass filter that absorbs or reflects light in a wavelength range (ultraviolet) of the excitation light L and transmits light in a wavelength range (R, G, B) of the object light $L_{OBJ}$ (fluorescence). A dichroic mirror used in a fluorescence microscope or the like may be applied to be used as the filter 42. The filter 42 is disposed closer to the light incidence side than the image sensor 5 and, in one or more embodiments, is disposed over the surface of incidence of light (over polarizing plate 31) of the light interference generator 1B.

Phase Modulation Device

The phase modulation device 21 is a phase modulator that temporally divides one of linearly polarized light that is polarized at 0° or linearly polarized light that is polarized at 90° to change a phase difference in N ways (N≥2). Here, the phase modulator 21 shifts a phase of linearly polarized light that is polarized at 0° and switches a shift amount in N ways at high speed by an electric means. With such a phase modulator 21, the light interference generator 1B switches the interference fringes that is formed into N patterns. The number of patterns of interference fringes is set according to optical information of the object OBJ to be obtained, an image reproduction method, or the like as in the above-described embodiment. Further, in this modification, the phase modulation device 21 shifts the phase by a shift amount corresponding to a wavelength. As the phase modulation device 21 having such polarization sensitivity and wavelength dependence, a liquid crystal element in which a liquid crystal is sandwiched between two transparent electrode films may be applied for use. The liquid crystal element can change an amount of phase shift of transmitted light by changing the magnitude of voltage that is applied to the liquid crystal. In one or more embodiments, the phase modulation device 21 employs a liquid crystal element having a high response speed to switch the amount of phase shift at a high speed. Further, as the phase modulation device 21, a wave plate whose phase modulation amount is controlled by a voltage, an electro-optical (EO) element that uses an electro-optical effect, or an optical element that modulates the phase of light by using a magneto-optical effect may be applied for use. Voltage to these phase modulation devices 21 are applied and its magnitude switched using a signal from the computer 6A.

The computer 6A exposes the image sensor 5 in synchronization with the switching of the applied voltage to the phase modulation device 21. Therefore, in the hologram recording device 10B according to the present modification, a response speed of the image sensor 5 may be high as the phase modulation device 21.

Hologram Recording Method

Figure 4:
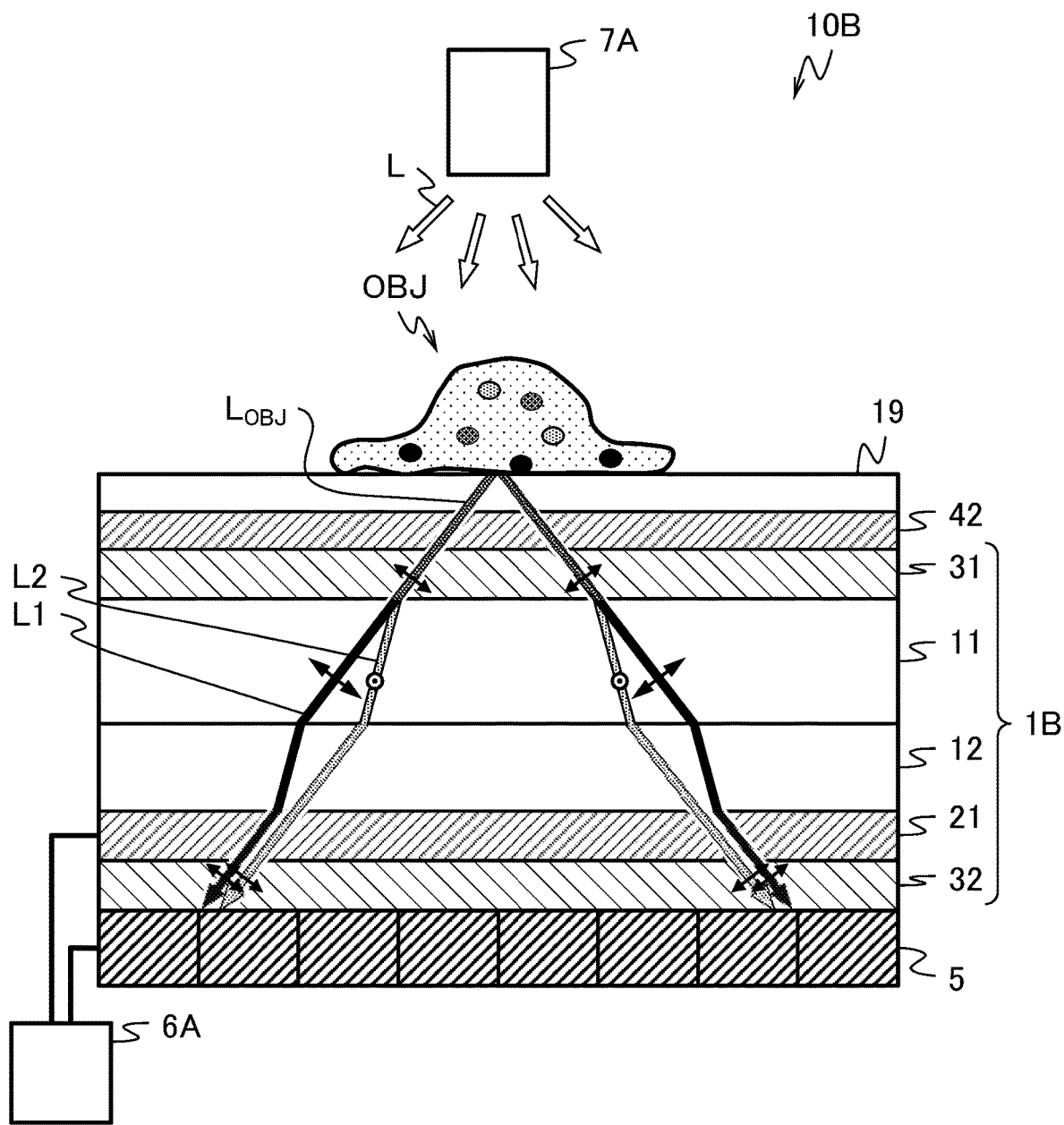
FIG. 4 is a sectional view schematically illustrating a configuration of a hologram recording device that includes a light interference generator according to a first modification example of the first embodiment of the present invention.

A hologram recording method of the hologram recording device 10B will be described with reference to FIG. 4. Although the excitation light L and the object light (fluorescence) $L_{OBJ}$ are shone on the surface of incidence of light of the light interference generator 1B, only the object light $L_{OBJ}$ enters the light interference generator 1B because of the filter 42. Then, similar to the embodiment shown in FIGS. 1 and 2, the object light $L_{OBJ}$ is transmitted through the polarizing plate 31 to become linearly polarized light that is polarized at 45°, transmitted through the first birefringent material 11 and the second birefringent material 12 in order, and is split into a light wave L1 of 0° linear polarization and a light wave L2 of 90° linear polarization.

Among the light waves L1 and L2 that are transmitted through the second birefringent material 12, the light wave L1, which is linearly polarized light that is polarized at 0°, changes its phase by a predetermined shift amount by the phase modulation device 21. Further, since the phase modulation device 21 has a wavelength dependence, a light wave having a phase changed by a shift amount that is different for each wavelength range of colors R, G, and B is formed. As a result, the phase modulator 21 changes the light wave L1 into three light waves in total so that there is one light wave for each wavelength range. Both the light waves L1 and L2 emitted from the phase modulation device 21 become 45° linearly polarized light by the polarizing plate 32. On the imaging surface of the image sensor 5, interference fringes are formed from a light wave L1 and light wave L2 of the same wavelength range, and a total of three patterns of interference fringes for R, G, and B colors overlap. The image sensor 5 captures an image of interference fringes of these three patterns collectively and records them as a multiplex hologram. Further, the phase modulator 21 changes the amount of phase shift of the light wave L1 by switching the magnitude of the applied voltage with the computer 6A, and as a result, the pattern of interference fringes changes. At the same time, the image sensor 5 again captures an image of interference fringes of individual colors collectively and records them as a multiplex hologram. In this way, by sequentially capturing images of interference fringes that are formed with the image sensor 5 while the applied voltage to the phase modulation device 21 is being switched, a number of holograms necessary for image reproduction is obtained.

Similar to the hologram recording device 10 according to the above-described embodiment, the hologram recording device 10B may support light other than visible light, such as near infrared light, and may include the light shielding plate 18 (see FIG. 3) of the above-described modified example. Further, the light interference generator 1B may include only the first birefringent material 11 or the second birefringent material 12. Further, the phase modulation device 21 of the light interference generator 1B may be disposed above the first birefringent material 11 (between the polarizing plate 31 and first birefringent material 11) or between the first birefringent material 11 and the second birefringent material 12.

In the case of the hologram recording device 10B according to the present modification, as the necessary number of holograms increases, an imaging time for one image becomes longer and the time resolution decreases. In the case of the hologram recording device 10 according to the above-described embodiment, since pixels of each of the multiplexed holograms are discrete, spatial resolution of the reproduced image is reduced. Therefore, by using a transmission-type liquid-crystal spatial light modulator as the phase shifter array 20 of the light interference generator 1 for the hologram recording device 10, and by driving the phase shifter array 20 with a signal from the computer 6A in the same manner as in the above-described modification example, it is possible to obtain multiplex holograms that are divided spatially and temporally into a large number of divisions. Specifically, the image sensor 5 captures an image each time an amount of phase shift for each cell (phase shifter) of the liquid-crystal spatial light modulator is changed or an arranged pattern of the phase shifters is changed. In one or more embodiments, a liquid-crystal spatial light modulator having a high response speed is used.

Second Modification

The liquid-crystal spatial light modulator used as the phase shifter array may be a reflection type. In general, a reflection-type liquid-crystal spatial light modulator is easy to miniaturize a cell and has high response speed that is better compared with a transmission type. A hologram recording device according to a second modification of the first embodiment of the present invention will be described below with reference to FIG. 5.

A hologram recording device 10C according to a modification of the first embodiment includes an image sensor 5 and a light interference generator 1C that is mounted on a surface of incidence of light (an imaging surface) of the image sensor 5. The hologram recording device 10C further includes a computer 6B for driving and controlling the image sensor 5 and a spatial optical phase modulator 20A of the light interference generator 1C, a light shielding plate 18 that covers a surface of incidence of light of the light interference generator 1C and has an opening formed therein, and a cover 19 for covering the entire surface of incidence, and may further include a light source 7 and a filter 41 (see FIG. 3) or a light source 7A and a filter 42 (see FIG. 4) as necessary. In the hologram recording device 10C, when light (light wave) $L_{OBJ}$ from an object (subject) OBJ is incident on the light interference generator 1C, the light interference generator 1C generates two light waves whose phases are different from each other, and an image sensor 5 records interference fringes formed by these two light waves as a hologram. As will be described later, the light interference generator 1C generates two or more sets of light waves simultaneously and also generates the sets of light waves by switching the phase difference between the light waves of each set; the image sensor 5 is exposed each time the phase difference is switched to sequentially record a plurality of multiplex holograms.

In the hologram recording device 10C, the light interference generator 1C is mounted on the imaging surface (surface of incidence of light) of the image sensor 5. The light interference generator 1C according to a modification of the first embodiment includes, along a direction of travel of light, a first birefringent material 11A, a spatial optical phase modulator (phase modulator) 20A, and a polarizing plate (polarizer) 32. The spatial optical phase modulator (phase modulator) 20A reflects and outputs incident light and also spatially and temporally divides a polarization component whose polarization direction is parallel to or perpendicular to an optic axis of the first birefringent material 11A to change a phase difference into four or more ways. The polarizing plate (polarizer) 32 has a transmission axis whose direction is inclined with respect to an optic axis of the first birefringent material 11A. The first birefringent material 11A has an inclined surface that is inclined with respect to the surface of incidence of light. This inclined surface is connected to a surface of incidence and output of light of the spatial optical phase modulator 20A. In one or more embodiments, the light interference generator 1C further includes a second birefringent material 12A whose optic axis is perpendicular to the optic axis of the first birefringent material 11A and a polarizing plate 31, similar to the light interference generator 1 according to the above-described embodiment.

A surface of incidence of light of the light interference generator 1C is horizontal as with the light interference generator 1, but a surface of exit is not parallel to the surface of incidence and here, the surface of exit is assumed to be vertical. Therefore, the image sensor 5 is arranged so that the imaging surface is placed vertically. Compared to the light interference generator 1 (see FIG. 1), the light interference generator 1C includes a reflective-type spatial optical phase modulator 20A in place of the phase shifter array 20 that transmits light, and further arranges the spatial optical phase modulator 20A so that the surface of incidence and output of light is facing obliquely upward. Accordingly, the first birefringent material 11A forms an inclined surface that is adapted to a direction that the spatial optical phase modulator 20A is facing, and the surface of incidence and output of light of the spatial optical phase modulator 20A is connected to the inclined surface. The second birefringent material 12A and the polarizing plate 32 are arranged in accordance with a traveling direction of reflected light by the spatial optical phase modulator 20A. In the case of the light interference generator 1C, since the spatial optical phase modulator 20A, which is a phase modulator, is connected to the first birefringent material 11A, the polarizing plate 32 is connected to a surface of exit of light of the second birefringent material 12A.

Spatial Optical Phase Modulator

The spatial optical phase modulator 20A is a reflection-type liquid-crystal spatial light modulator that is mounted on a liquid crystal projector or the like, and a specific example is a liquid crystal on silicon spatial light modulator (LCOS-SLM), and, in one or more embodiments, has a high response speed. By applying voltage of a different magnitude to each cell, the spatial optical phase modulator 20A is able to arbitrarily arrange phase shifters each having a phase shift amount corresponding to the magnitude of applied voltage. The phase shifters of the spatial optical phase modulator 20A and the arrangement pattern of the phase shifters are similar to those of the phase shifter array 20 of the light interference generator 1. N types of phase shifters for shifting a phase by different shift amounts for linearly polarized light of either 0° or 90° is randomly arranged to form a two dimensional array (N≥2). Further, each phase shifter shifts a phase by a shift amount according to a wavelength. Here, as in the above-described embodiment, it is assumed that N=2, the spatial optical phase modulator 20A includes phase shifters 2a and 2b and shifts the phase of linearly polarized light that is polarized at 0°. Further, by changing the magnitude of applied voltage to each cell, the spatial optical phase modulator 20A may change an amount of phase shift for each cell (phase shifter) or may change an array pattern of the phase shifters. Such driving of the spatial optical phase modulator 20A is controlled by a signal from the computer 6B, similar to the phase modulation device 21 of the light interference generator 1B according to the above-described modification.

In order to reflect light (light waves L1 and L2) that is incident from above in a lateral direction (to the right in FIG. 5), the spatial optical phase modulator 20A is disposed so that the surface of incidence and output of light is inclined with respect to the surface of incidence of light of the light interference generator 1C. Specifically, reflected light from the spatial optical phase modulator 20A is made to reach an outside of the surface of incidence of light of the light interference generator 1C. The closer the inclination angle of the spatial optical phase modulator 20A is to 45°, the greater the maximum spread angle of the object light $L_{OBJ}$. On the other hand, when the inclination angle is large, the angle of incidence of the light waves L1 and L2, which spread to the light exit side in the lateral direction, to the spatial optical phase modulator 20A becomes large and approaches 90° (inner direction of surface of incidence and output). Here, the spatial optical phase modulator 20A is disposed at an angle of 45° with respect to the surface of incidence of light of the light interference generator 1.

First Birefringent Material

Similar to the first birefringent material 11 of the above-described embodiment, the first birefringent material 11A is an optical element made of a birefringent material for generating two light waves L1 and L2 from the object light $L_{OBJ}$. In the case of the light interference generator 1C, the first birefringent material 11A includes a surface that is inclined with respect to a horizontal surface of incidence of light so that the inclined surface can connect to the surface of incidence and output of light of the obliquely arranged spatial optical phase modulator 20A. Here, the first birefringent material 11A has a surface inclined at 45° in accordance with the spatial optical phase modulator 20A. In the first birefringent material 11A, the light waves L1 and L2 traveling from above are reflected by the spatial optical phase modulator 20A connected to the inclined lower surface and travel laterally. In one or more embodiments, because the light waves L1 and L2 change the traveling direction in the first birefringent material 11A in this way, the first birefringent material 11A is disposed so that its optic axis (which is the slow axis in this case) is 90° (perpendicular to the sheet surface in FIG. 5). Here, the first birefringent material 11A is formed so that the lateral surface of exit of light forms, with respect to the surface of incidence, an angle that is twice the inclination angle of the spatial optical phase modulator 20A so that light that spreads and travels in a different direction at the same angle has the same optical path length. Therefore, in this embodiment, the surface of exit of light is a vertical side surface of 90°, which is double the angle of 45°. In the first birefringent material 11A, a path length of light that is incident in the normal direction of the surface of incidence of light is the sum of the following and is long: a length from the center of the surface of incidence to the inclined surface in the normal direction; and a length of the perpendicular line from the arrival point on the inclined surface to the surface of exit. Because of this long length, a material that does not have a strong birefringence may be selected so that a difference between the optical path lengths of the light waves L1 and L2 in the light interference generator 1C does not become excessive.

Second Birefringent Material

Similar to the second birefringent material 12 of the above-described embodiment, the second birefringent material 12A is a flat-plate-shaped optical element of a uniform thickness and is made of a birefringent material for generating two light waves L1 and L2 from the object light $L_{OBJ}$ together with the first birefringent material 11A. The second birefringent material 12 is disposed so that a direction of its optic axis is orthogonal to that of the first birefringent material 11A. In the light interference generator 1C, since the second birefringent material 12A is connected to the surface of exit of light of the first birefringent material 11A, the second birefringent material 12A is disposed so that its surface of incidence, which is the connected surface, is vertical. Therefore, the second birefringent material 12A is disposed so that a direction of its optic axis (slow axis) is 0° (vertical direction in FIG. 5). Further, similar to the above-described embodiment, total optical path lengths of the light wave L1 and light wave L2 along the birefringent materials 11A and 12A and the spatial optical phase modulator 20A are configured so that the total optical path lengths have an appropriate difference such as falling within a coherence length (coherence length). To do this, the material of the first birefringent material 11A and the material and thickness of the second birefringent material 12A are designed based on the above-mentioned path length of light that is incident in the normal direction of the surface of incidence of light, instead of a thickness of the first birefringent material 11A. In order to reduce the size of the light interference generator 1C, a material having a birefringence stronger than at least the first birefringent material 11A may be selected so as to suppress the thickness.

Light Shielding Plate

Since the optical path lengths of the light waves L1 and L2 in the first birefringent material 11A is mainly long, the light interference generator 1C may include a light shielding plate 18 configured with an opening on the surface of incidence of light of the light interference generator 1C (over the polarizing plate 31). The opening of the light shielding plate 18 is formed at the center of the surface of incidence of light and is circularly shaped or is a polygon close to the circular shape and has a size that is able to fit the object OBJ in a plan view. By having an aperture, spread angles of the object light $L_{OBJ}$ in the light interference generator 1C and the light waves L1 and L2 generated from the object light $L_{OBJ}$ may be suppressed and the light waves L1 and L2 may be prevented from reaching the outside of the imaging surface of the image sensor 5.

Hologram Recording Method

Figure 5:
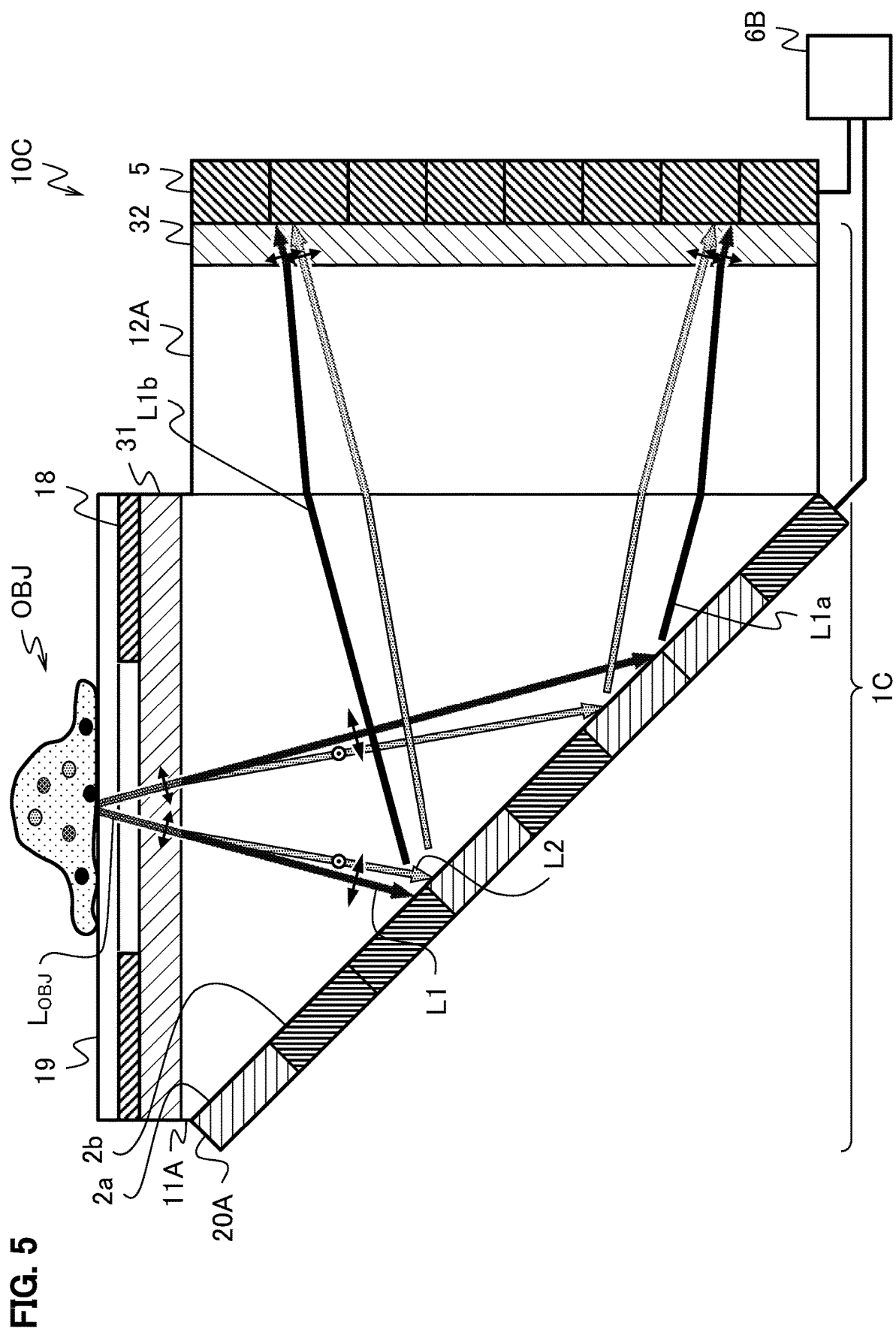
FIG. 5 is a sectional view schematically illustrating a configuration of a hologram recording device including a light interference generator according to a second modification example of the first embodiment of the present invention.

A hologram recording method of the hologram recording device 10C will be described with reference to FIG. 5. Similar to the embodiment shown in FIGS. 1 and 2, the object light $L_{OBJ}$ is transmitted through the polarizing plate 31 and becomes linearly polarized light that is polarized at 45°. Then, the light enters the first birefringent material 11A and is split into a light wave L1 having a linear polarization of 0° and a light wave L2 having a linear polarization of 90°, and a change occurs at the surface of incidence and output of the spatial optical phase modulator 20A that is connected to the inclined surface of the first birefringent material 11A. The light waves L1 and L2 that have reached the spatial optical phase modulator 20A are reflected and travel laterally through the first birefringent material 11A. Among the light waves L1 and L2 reflected by the spatial optical phase modulator 20A, the light wave L1 which is linearly polarized light that is polarized at 0° changes its phase by a shift amount that is different for each of the cells (phase shifters) 2a and 2b of the spatial optical phase modulator 20A, and changes into light waves L1a and L1b of different phases. Further, because the phase shifters 2a and 2b have wavelength dependence, two light waves whose phases have changed by two shift amounts are formed for each wavelength range of colors R, G, and B. The light waves L1a, L1b, and L2 exit from the side surface of the first birefringent material 11A, enters the second birefringent material 12A, exit from the second birefringent material 12A, and enters the polarizing plate 32.

The light waves L1a and L1b and light wave L2 are both linearly polarized at 45° by the polarizing plate 32. At the imaging surface of the image sensor 5, the light wave L1a and light wave L2 of the same wavelength range and the light wave L1b and light wave L2 of the same wavelength range respectively form interference fringes, and two patterns for each of the colors R, G, and B totaling six patterns of interference fringes overlap each other. The image sensor 5 captures an image of the interference fringes of these six patterns collectively and records them as a multiplex hologram. Further, the spatial optical phase modulator 20A changes an amount of phase shift of the light wave L1 by switching a magnitude of the applied voltage with the computer 6B, and as a result, the pattern of interference fringes changes. At the same time, the image sensor 5 again captures an image of six patterns of interference fringes collectively and records them as a multiplex hologram. In this way, by sequentially capturing images of interference fringes that are formed with the image sensor 5 while the applied voltage to the spatial optical phase modulator 20A is being switched, a number of holograms necessary for image reproduction is obtained.

Similar to the hologram recording device 10 according to the above-described embodiment, the hologram recording device 10C according to the present modification may support light other than visible light, such as near infrared light. Further, the light interference generator 1C may connect the second birefringent material 12A to the surface of incidence of the first birefringent material 11A, or may be provided with only the first birefringent material 11A and not the second birefringent material 12A.

Second Embodiment

The hologram recording device according to the first embodiment and the modification thereof is configured with a light interference generator that includes a phase modulation device or a phase shifter array for dividing a specific linearly polarized light in at least one of time or space and changing the phase difference into two or more ways to obtain a multiplex hologram. A plurality of holograms may also be obtained by spatially dividing circularly polarized light and changing the phase difference in two or more ways by transmitting the circularly polarized light through a polarizer array in which polarizers having different transmission axis directions are two-dimensionally arranged. A hologram recording device according to a second embodiment of the present invention will be described below.

Figure 6:
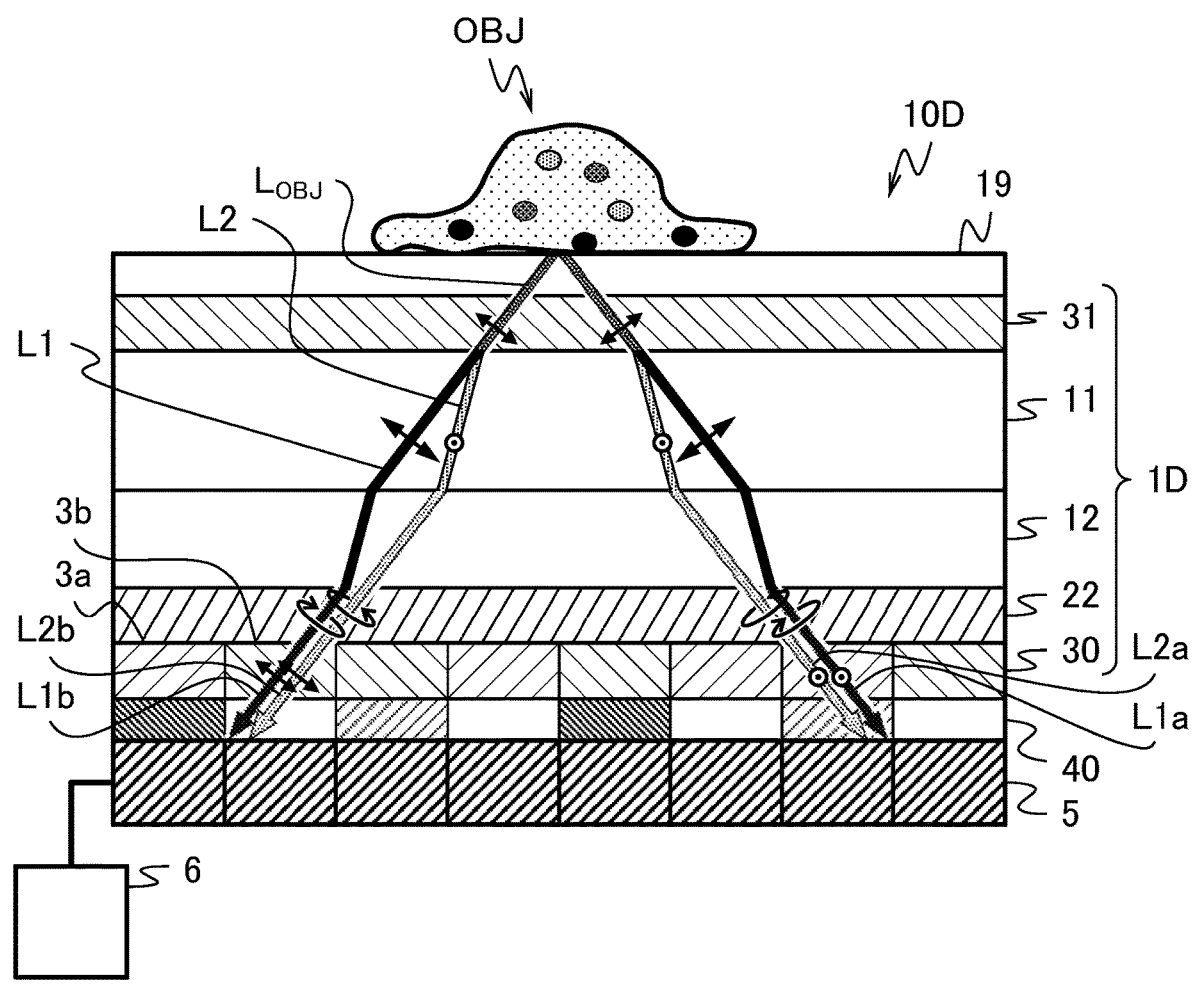
FIG. 6 is a sectional view schematically illustrating a configuration of a hologram recording device that includes a light interference generator according to a second embodiment of the present invention.

As shown in FIG. 6, the hologram recording device 10D according to the second embodiment includes an image sensor 5 and a light interference generator 1D that is mounted on a surface of incidence of light (an imaging surface) of the image sensor 5. The hologram recording device 10D further includes a color filter array 40 that is connected to the imaging surface of the image sensor 5, a computer 6 for driving and controlling the image sensor 5, and a cover 19 for covering a surface of incidence, and may further include a light source 7 or a light source 7A, a filter 41 or 42, or a light shielding plate 18 (see FIG. 5) as necessary. In the hologram recording device 10D, when light (light wave) $L_{OBJ}$ from an object (subject) OBJ is incident on the light interference generator 1D, the light interference generator 1D generates two light waves whose phases are different from each other, and an image sensor 5 records interference fringes formed by these two light waves as a hologram. Referring to the two light waves that form interference fringes as a set, the light interference generator 1D generates two or more sets of light waves simultaneously and the image sensor 5 may record a multiplex hologram through one exposure as will be described later.

The light interference generator 1D according to a second embodiment of the present invention includes, in the following order starting from a side on which light is incident, a first birefringent material 11, a quarter-wave plate 22 whose slow axis is inclined at 45° or 135° with respect to an optic axis of the first birefringent material 11, and a polarizer array 30 in which a plurality of polarizers with different directions of transmission axis are arranged two-dimensionally. In one or more embodiments, the light interference generator 1D further includes a second birefringent material 12 having an optic axis that is orthogonal to the optic axis of the first birefringent material 11, and the second birefringent material 12 is connected to a surface of exit of light of the first birefringent material 11, in other words, between the first birefringent material 11 and the quarter-wave plate 22. In one or more embodiments, the light interference generator 1D further includes a polarizing plate 31 on a light incidence side of the first birefringent material 11, and a transmission axis of the polarizing plate 31 is inclined with respect to the optic axis of the first birefringent material 11. The light interference generator 1 is configured so that these components (optical elements) form layers without gaps.

Quarter-Wave Plate

The quarter-wave plate 22 converts the linearly polarized light that is polarized at 0° and the linearly polarized light that is polarized at 45° that have been split by the first birefringent material 11 and the second birefringent material 12 into circularly polarized lights that are opposite to each other, in other words, right-handed circularly polarized light and left-handed circularly polarized light. For this purpose, the quarter-wave plate 22 is disposed so that its slow axis is inclined at 45° or 135° with respect to the optic axis of the first birefringent material 11. In one or more embodiments, the quarter-wave plate 22 is a wide-band wave plate having no wavelength dependence. The quarter-wave plate 22 may be a ¾-wave plate.

(Polarizer Array)

The polarizer array 30 is formed by arranging polarizers having different transmission axis directions in a two dimension array. The polarizers are arranged so that transmission axes of adjacent polarizers are not orthogonal to each other and a difference in the directions of the transmission axes is, in one or more embodiments, 30° to 60°. Therefore, in one or more embodiments, the transmission axis direction of individual polarizers is set at 45° intervals, such as 0° and 45°, in the case of two directions, or set at 0°, 45°, 90°, and 135° in the case of four directions. In FIG. 6, the polarizer array 30 includes polarizers 3a and 3b having transmission axes of 90° and 45° respectively. Similar to the phase shifter array 20 of the light interference generator 1 according to the first embodiment, in one or more embodiments, the polarizers 3a and 3b of the polarizer array 30 each provides a phase distribution of a spherical wave with no turn-back. In one or more embodiments, the polarizer array 30 is arranged so that the number of polarizers 3a and the number of polarizers 3b are equal or close. In one or more embodiments, the number of cells (polarizers) of the polarizer array 30 is equal to or less than the number of pixels of the image sensor 5. In one or more embodiments, said number of cells and said number of pixels are the same (same array).

Color Filter Array

The color filter array 40 is arranged over an imaging surface of the image sensor 5 that is a monochrome image sensor and forms a single-plate type color image sensor. The color filter array 40 is formed by arranging color filters of three colors in a mosaic pattern. A color filter transmits light in one of the wavelength ranges of colors R, G, and B and absorbs other light. For examples, the color filters of three colors are arranged in a Bayer arrangement that is generally used in a color image sensor. In one or more embodiments, the color filter array 40 has the same arrangement of cells (color filters) as the pixels of the image sensor 5, or has a cell arranged for an integer multiple of pixels, for example, one cell for 2×2 pixels.

Hologram Recording Method

A hologram recording method of the hologram recording device 10D will be described with reference to FIG. 6. Similar to the first embodiment shown in FIGS. 1 and 2, the object light $L_{OBJ}$ is transmitted through the polarizing plate 31 to become linearly polarized light that is polarized at 45° and is transmitted through the first birefringent material 11 and second birefringent material 12 in sequence to be split into a light wave L1 of linearly polarized light that is polarized at 0° and a light wave L2 of linearly polarized light that is polarized at 90° with a 1:1 intensity ratio.

By the quarter-wave plate 22, the light wave L1 becomes a right-handed circularly polarized light and the light wave L2 becomes a left-handed circularly polarized light. When the light waves L1 and L2 which are circularly polarized in reverse to each other are transmitted through the polarizer array 30, the light waves L1 and L2 become light waves L1a and L1b and light waves L2a and L2b that are aligned to be linearly polarized in the transmission axis direction of each of the cells (polarizers) 3a and 3b that was passed through. Further, in accordance with the transmission axis directions of the polarizers 3a and 3b, phase shift amounts of the 0° polarization component and the 90° polarization component, that is, the light waves L1 and L2 differ. Accordingly, a phase difference between the light waves L1a and L2a and a phase difference between the light waves L1b and L2b differ. More specifically, the phase difference between the light waves L1a and L2a and the phase difference between the light waves L1b and L2b that have passed through polarizers 3a and 3b with a 45° difference in the transmission axis direction differs by $\pi/2$. As a result, the light waves L1a and L2a and the light waves L1b and L2b respectively form interference fringes because they have the same polarization direction, and, further, two patterns of interference fringes in which the phase difference between the light waves L1 and L2 is different are formed from the light waves La and L2a and the light waves L1b and L2b on the imaging surface of the image sensor 5.

The light waves L1a and L2 and the light waves L1b and L2b are transmitted through the color filter array 40, and only light in the wavelength range of color R, G, or B is transmitted through each color filter to reach the image sensor 5. The image sensor 5 collectively captures two patterns of interference fringes for each group of pixels that correspond to color filters of the same color of the color filter array 40 and records them as a multiplex hologram.

Modified Example

In the hologram recording device 10D, the arrangement of the color filter array 40 and the polarizer array 30 may be exchanged. In the hologram recording device 10D, for example, in a case where two colors of light, R and G, are imaged, the color filter array 40 includes color filters of two colors, R and G. Instead, in the hologram recording device 10D, the color filter array 40 may be arranged with color filters of four or more colors to capture light of said four or more colors. The hologram recording device 10D does not need the color filter array 40 when an image to be reproduced is monochrome. Further, the hologram recording device 10D may be configured without the color filter array 40 but with a layered-type color image sensor as the image sensor 5. Such a configuration improves the spatial resolution. Similar to the hologram recording device 10 according to the first embodiment, the hologram recording device 10D may support light other than visible light such as near infrared light. The light interference generator 1D may include only the first birefringent material 11 or the second birefringent material 12. In place of the birefringent materials 11 and 12 and the quarter-wave plate 22, the light interference generator 1D may include a geometric phase lens such as a polarization-directed flat lens that splits non-polarized light into circularly polarized lights that rotate in opposite directions to each other (see Non-Patent Literature 4).

Third Embodiment

In the hologram recording device according to the first embodiment and the second embodiment, the light interference generator generates two light waves for forming interference fringes from object light. It is also possible to obtain a hologram by forming interference fringes from object light and reference light. A hologram recording device according to a third embodiment of the present invention will be described below.

Figure 7:
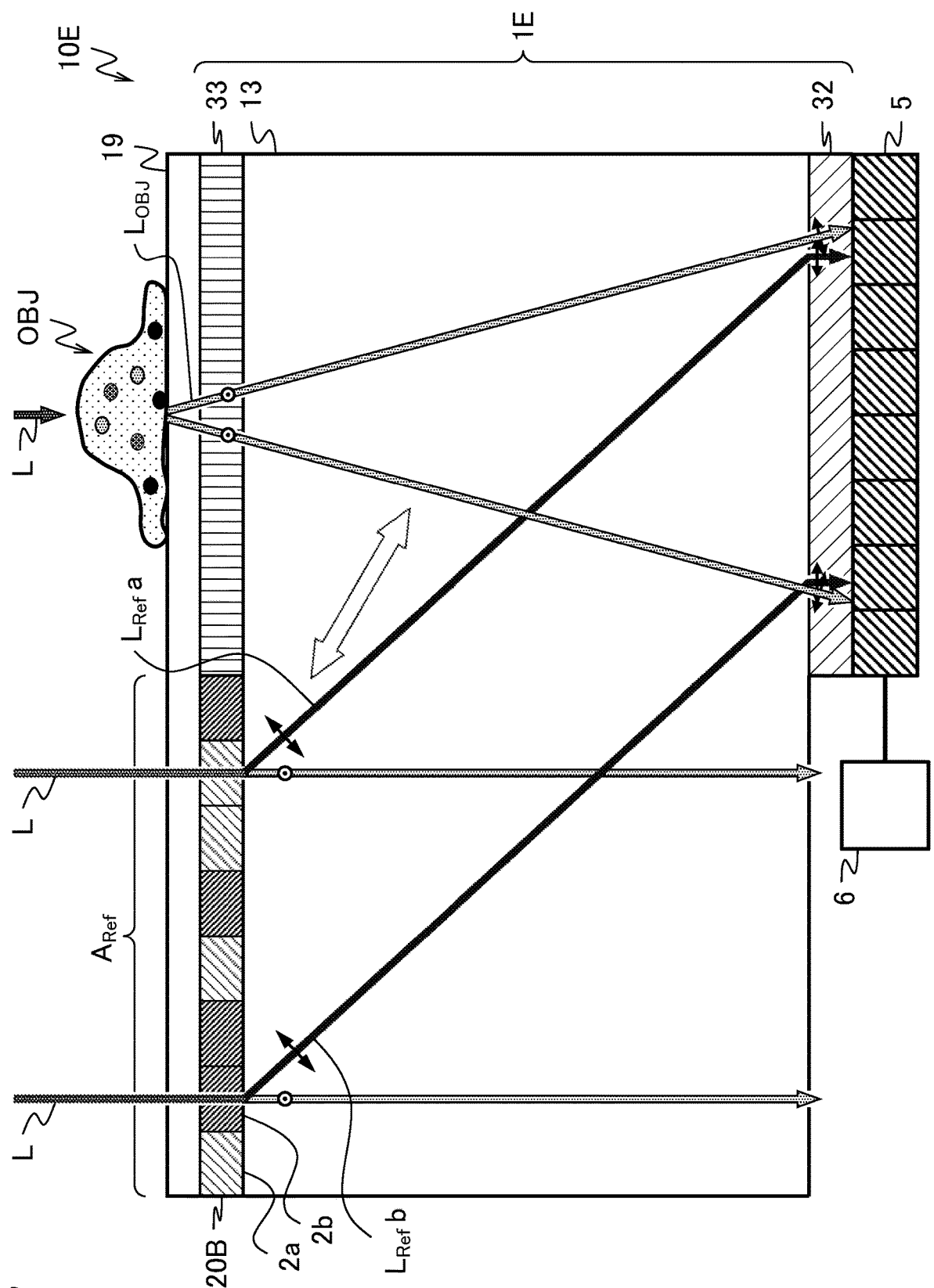
FIG. 7 is a sectional view schematically illustrating a configuration of a hologram recording device that includes a light interference generator according to a third embodiment of the present invention.

As shown in FIG. 7, the hologram recording device 10E according to the third embodiment includes an image sensor 5 and a light interference generator 1E that is mounted on a surface of incidence of light (an imaging surface) of the image sensor 5. The hologram recording device 10E further includes a light source (not shown) for irradiating the light interference generator 1E and an object (subject) OBJ with light L, a computer 6 for driving and controlling the image sensor 5, and a cover 19 for covering a surface of incidence. With the hologram recording device 10E, an object OBJ is placed above the light interference generator 1E (on the cover 19) in a region that, in a plan view (a surface of incidence of light), fits in the imaging surface of an image sensor 5. In the hologram recording device 10E, the light interference generator 1E receives light $L_{OBJ}$ from the object OBJ that is irradiated with the light L and uses the light L that enters a part of a surface of incidence of light that is outside an area where the object light $L_{OBJ}$ enters as reference light in order to generate light waves having different phases from each other from light L and light $L_{OBJ}$. And further, the image sensor 5 records interference fringes formed by these two light waves as a hologram. Referring to the two light waves that form interference fringes as a set, the light interference generator 1E generates two or more sets of light waves simultaneously and the image sensor 5 may record a multiplex hologram through one exposure as will be described later. The hologram recording device 10E may obtain three-dimensional information of an object OBJ that transmit light as a subject, and may for example be applied to a quantitative phase microscope.

A light interference generator 1E according to a third embodiment of the present invention includes, in the following order starting from a side on which light is incident, a phase shifter array (phase modulator) 20B, a birefringent material (first birefringent material) 13, and a polarizing plate (polarizer) 32 having a transmission axis whose direction is, in a plan view, inclined with respect to an optic axis of the birefringent material 13. The phase shifter array 20B spatially divides at least a polarization component whose polarization is parallel to the optic axis of the birefringent material 13 and changes a phase difference into two or more ways. In the light interference generator 1E of the hologram recording device 10E, the phase shifter array 20B is, in a plan view, arranged side by side with the image sensor 5 in the optic axis direction (left to right or right to left direction in FIG. 7) of the birefringent material 13 without overlapping with the image sensor 5. In a plan view, the polarizing plate 32 is arranged at least in the same region as the image sensor 5. The light interference generator 1E connects a surface of exit of light of the polarizing plate 32 to the imaging surface of the image sensor 5. In one or more embodiments, the light interference generator 1E further includes a polarizing plate 33 on the light incidence side of the birefringent material 13. In a plan view, the polarizing plate 33 is in the same region as the image sensor 5 and a transmission axis of the polarizing plate 33 is in a direction that is orthogonal to the optic axis of the birefringent material 13. The phase shifter array 20B and the polarizing plate 33 are arranged adjacent to each other on the surface of incidence of light of the birefringent material 13. In the light interference generator 1E, a region immediately above the image sensor 5 is referred to as an object light incidence region and a region adjacent to this region in the optic axis direction of the birefringent material 13 in a plan view is referred to as a reference light incidence region $A_{Ref}$. That is, in the light interference generator 1E, the phase shifter array 20B is limited to the reference light incidence region $A_{Ref}$, the polarizing plate 33 is limited to the object light incidence region, and the polarizing plate 32 is at least in the object light incidence region. In one or more embodiments, in the light interference generator 1E, the reference light incidence region $A_{Ref}$ has the same shape and size as the imaging surface of the image sensor 5, that is, the object light incidence region. Therefore, in a plan view, the light interference generator 1E has a shape of two image sensors 5 that are arranged adjacent to each other.

Light Source

As with the first and second embodiments, the light L irradiated by the light source of the hologram recording device 10E is non-polarized light and does not need to be coherent light, but is parallel light that is perpendicular (angle of incidence of 0°) to the surface of incidence of light of the light interference generator 1E. For this purpose, the light source includes an illumination device including an LED or the like and an optical element such as a collimator and emits parallel light of a luminous flux that encompasses the entire surface of incidence of light of the light interference generator 1E. A part of the light L is incident on the object OBJ, and the object light $L_{OBJ}$ from the object OBJ enters the light interference generator 1E. Further, reference light $L_{Ref}a$ and reference light $L_{Ref}b$ are generated from the light L that is incident on the reference light incidence region $A_{Ref}$ of the light interference generator 1E.

Birefringent Material

The birefringent material 13 is a flat-plate shaped optical element made of a birefringent material and having a uniform thickness, and is provided over the entire surface of incidence of light of the light interference generator 1E. The birefringent material 13 controls the traveling directions of the object light $L_{OBJ}$ and the reference light $L_{Ref}a$, $L_{Ref}b$, which have entered the light interference generator 1E from different regions of the surface of incidence of light of the light interference generator 1E, in order to make two light waves which can interfere with each other on the imaging surface of the image sensor 5. As the birefringent material, the same material as that of the birefringent materials 11 and 12 of the first embodiment may be selected. The birefringent material 13 is arranged with its optic axis (indicated by a white, double-headed arrow in FIG. 7) oriented in a direction, and in the present embodiment, the direction of the optic axis of the birefringent material 13 at the surface of incidence of light is defined as a 0° direction (a left-to-right or right-to-left direction in FIG. 7). Since linearly polarized light that is polarized at 90° (in a direction perpendicular to the surface of the sheet of paper in FIG. 7) becomes an ordinary ray by the birefringent material 13, the object light $L_{OBJ}$ is made into linearly polarized light that is polarized at 90° and is made to travel toward the image sensor 5. Linearly polarized light that is polarized at 0°, which is an extraordinary ray, is reference light $L_{Ref}a$, $L_{Ref}b$. In order to refract the extraordinary ray of the vertically incident light L to the object light incidence region side, the optic axis of the birefringent material 13 is tilted in a thickness direction (direction of incidence of the light L). Here in the present embodiment, the birefringent material 13 is assumed to be a positive crystal, and the optic axis is tilted downward from the reference light incidence region $A_{Ref}$ side to the object light incidence region side.

The birefringent material 13 is designed with a material and a thickness so that the extraordinary ray (reference light $L_{Ref}a$, $L_{Ref}b$) that has entered the reference light incidence region $A_{Ref}$ is incident on the imaging surface of the image sensor 5. To be more specific, when an angle of refraction of the extraordinary ray is expressed as φ (0°<φ<90°), the thickness of the birefringent material 13 is (1/tan φ) times a length of the image sensor 5 in the 0° direction. Accordingly, the birefringent material 13 is designed to be thinner as the angle of refraction q of the extraordinary ray is larger. When the thickness of the birefringent material 13 is small, the light interference generator 1E can be reduced in size (thickness) and the maximum spread angle of the object light $L_{OBJ}$ can be increased. For this reason, in one or more embodiments, the birefringent material 13 is selected from a material having strong birefringence and arranged so that the optic axis is in a direction in which the angle of refraction q is maximized.

Phase Shifter Array

The phase shifter array 20B has the same configuration as the phase shifter array 20 of the light interference generator 1 according to the first embodiment and includes N kinds of phase shifters (N≥2) that are randomly arranged in two dimensions and are configured to shift a phase of linearly polarized light that is polarized at 0°, which becomes an extraordinary ray in the birefringent material 13, by different shift amounts. Each phase shifter shifts the phase by a shift amount according to wavelength. Here, as in the above-described embodiment, it is assumed that N=2, and the phase shifter array 20B includes phase shifters 2a and 2b. Alternatively, the phase shifter array 20B may use a holographic optical element or a diffractive optical element having no polarization dependence as phase shifters.

Polarizing Plate

The polarizing plate 32 has the same configuration as that of the polarizing plate 32 of the light interference generator 1 according to the first embodiment, and converts the object light $L_{OBJ}$, which is linearly polarized at 90°, and the reference light $L_{Ref}a$, $L_{Ref}b$, which is linearly polarized at 0°, into linearly polarized light of the same polarization component in order to make interference possible. The polarizing plate 33 may be arranged on the light incidence side of the birefringent material 13 as necessary with the transmission axis in the 90° direction in order to make the object light $L_{OBJ}$ linearly polarized at 90° which becomes an ordinary ray of the birefringent material 13.

Hologram Recording Method

A hologram recording method of the hologram recording device 10E will be described with reference to FIG. 7. When the light interference generator 1E is vertically irradiated with light L that is parallel light, the object OBJ is irradiated with a part of the light L, and object light $L_{OBJ}$ from the object OBJ enters the light interference generator 1E. The object light $L_{OBJ}$ is, similar to the light L, incoherent and non-polarized light, but becomes linearly polarized light that is polarized at 90° after passing through the polarizing plate 33. When the object light $L_{OBJ}$ that has been linearly polarized at 90° enters the birefringent material 13, because the object light $L_{OBJ}$ is an ordinary ray, the object light $L_{OBJ}$ travels without being affected by the direction of the optic axis of the birefringent material 13 and reaches the polarizing plate 32. Light L that is incident on the reference light incidence region $A_{Ref}$, on the other hand, enters the phase shifter array 20B, and a 0° polarization component thereof changes its phase by a shift amount that is different for each of the cells (phase shifters) 2a and 2b and changes into light waves (reference light) $L_{Ref}a$ and $L_{Ref}b$ having different phases. Each of the reference light $L_{Ref}a$ and $L_{Ref}b$ forms a spherical wave. Further, since the phase shifters 2a and 2b have wavelength dependence, two light waves having phases changed by two shift amounts are formed for each wavelength range of the colors R, G, and B. When the light L, whose 0° polarization component has been changed to reference light $L_{Ref}a$ and $L_{Ref}b$ by the phase shifter array 20B, enters the birefringent material 13, a 90° polarization component thereof is transmitted as a ordinary ray and travels straight, and the 0° polarization component, in other words, reference light $L_{Ref}a$ and $L_{Ref}b$, is refracted as extraordinary rays so as to approach the optic axis direction and reach the polarizing plate 32.

Both the object light $L_{OBJ}$ and the reference light $L_{Ref}a$ and $L_{Ref}b$ become linearly polarized light that is polarized at 45° by the polarizing plate 32. Then, at the imaging surface of the image sensor 5, the object light $L_{OBJ}$ and the reference light $L_{Ref}a$ of the same wavelength range and the object light $L_{OBJ}$ and the reference light $L_{Ref}b$ of the same wavelength range respectively form interference fringes, and two patterns for each of the colors R, G, and B totaling six patterns overlap each other. The image sensor 5 collectively captures an image of the interference fringes of these six patterns and records them as a multiplex hologram.

Modified Example

The hologram recording device 10E may include a light shielding plate 18 (see FIG. 5) of a modified example of the first embodiment in an object light incidence region (over the polarizing plate 33) of the surface of incidence of light of the light interference generator 1E. Further, the light interference generator 1E may include as the birefringent material 13 two or more layers of birefringent materials in order to adjust an optical path length difference between the object light $L_{OBJ}$ and the reference light $L_{Ref}a$, $L_{Ref}b$. Each of the two or more layers of birefringent materials has a different refractive index for at least one of the ordinary ray or the extraordinary ray, or has a different angle of inclination of the optical axis in a thickness-wise direction. Further, the light interference generator 1E may be configured without the polarizing plate 33, and in this case, the birefringent material 13 is configured to refract the 0° polarization component of the object light $L_{OBJ}$ so that said 0° polarization component does not fall on the image sensor 5. Further, as in the light interference generator 1B (see FIG. 4) according to the modification of the first embodiment, the light interference generator 1E may include a phase modulation device 21 instead of the phase shifter array 20B to change the phase difference in two or more ways by temporal division. Further, in the light interference generator 1E, as in the modified example of the first embodiment, by using a transmission-type liquid-crystal spatial light modulator as the phase shifter array 20B and driving the phase shifter array 20B by an electric means, it is possible to obtain multiplex holograms that are divided spatially and temporally into a large number of divisions. The phase shifter array such as a liquid-crystal spatial light modulator and the phase modulation device may be of a reflection type as in the modification of the first embodiment. A hologram recording device according to a modification of the third embodiment of the present invention will be described below with reference to FIG. 8.

A hologram recording device 10F according to a modified example of the third embodiment includes an image sensor 5 and a light interference generator 1F that is mounted on a surface of incidence of light (an imaging surface) of the image sensor 5. The hologram recording device 10F further includes a light source (not shown) for irradiating the light interference generator 1F and an object (subject) OBJ with light L, a computer 6B for driving and controlling the image sensor 5 and a spatial optical phase modulator 20A of the light interference generator 1F, and a cover 19 for covering a surface of incidence. The light source has a configuration similar to that of the above-described embodiment. Similar to the hologram recording device 10E according to the above-described embodiment, with the hologram recording device 10F, an object OBJ is placed above the light interference generator 1F (on the cover 19) in a region that, in a plan view (a surface of incidence of light), fits in the imaging surface of the image sensor 5. In the hologram recording device 10F, the light interference generator 1F receives light $L_{OBJ}$ from the object OBJ that is irradiated with light L and uses light L that enters a part of a surface of incidence of light that is outside an area where the object light $L_{OBJ}$ enters as reference light in order to generate light waves having different phases from each other from light L and light $L_{OBJ}$. And further, the image sensor 5 records interference fringes formed by these two light waves as a hologram. As will be described later, the light interference generator 1F generates two or more sets of light waves simultaneously and also generates the sets of light waves by switching a phase difference between the light waves of each set; and the image sensor 5 is exposed each time the phase difference is switched to sequentially record a plurality of multiplex holograms.

The light interference generator 1F according to a modified example of the third embodiment includes, along a direction of travel of light, a birefringent material (first birefringent material) 13A, a spatial optical phase modulator (phase modulator) 20A, and a polarizing plate (polarizer) 32. The spatial optical phase modulator (phase modulator) 20A reflects and outputs incident light and also spatially and temporally splits a polarization component whose polarization is parallel to an optic axis of the first birefringent material 13A to change a phase difference into four or more ways. The polarizing plate (polarizer) 32 has a transmission axis whose direction in a plan view is inclined with respect to an optic axis of the birefringent material 13A. Similar to the light interference generator 1E according to the above-described embodiment, the light interference generator 1F includes a region (object light incidence region) immediately above the image sensor 5 in the hologram recording device 10F and a reference light incidence region $A_{Ref}$ that is, in a plan view, adjacent to this region in an optic axis direction of the birefringent material 13A. A surface of incidence and output of light of the spatial optical phase modulator 20A is connected to a side surface of the birefringent material 13A on the side of the reference light incidence region $A_{Ref}$. Further, the light interference generator 1F includes a polarizing plate 32 at least in an object light incidence region. In one or more embodiments, the light interference generator 1F further includes a polarizing plate 33 in an object light incidence region and a polarizing plate 34 in a reference light incidence region $A_{Ref}$ on a surface of incidence of light of the birefringent material 13A. The polarizing plate 33 has a transmission axis whose direction is perpendicular to the optic axis of the birefringent material 13A. The polarizing plate 34 has a transmission axis whose direction is parallel to the optic axis direction of the birefringent material 13A. In one or more embodiments, the light interference generator 1F is configured so that a length of the reference light incidence region $A_{Ref}$ in a direction perpendicular to the optic axis of the birefringent material 13A in a plan view is the same as that of the object light incidence region (the same as that of the image sensor 5). A length of the reference light incidence region $A_{Ref}$ in a direction of the optic axis of the birefringent material 13A is designed according to an arrangement of the spatial optical phase modulator 20A or the like as will be described later.

Birefringent Material

The birefringent material 13A is a flat-plate shaped optical element made of a birefringent material and having a uniform thickness, and is provided over the entire surface of incidence of light of the light interference generator 1F. Similar to the birefringent material 13 of the light interference generator 1E according to the above-described embodiment, the birefringent material 13A controls traveling directions of the object light $L_{OBJ}$ and the light $L_{Ref}$ (reference light $L_{Ref}$a, $L_{Ref}$b) that enters the light interference generator 1F from different regions of its surface of incidence of light so as to form two light waves capable of interfering with each other on the imaging surface of the image sensor 5. The birefringent material 13A has an optic axis (indicated by a white, double-headed arrow in FIG. 8) that is arranged in a direction, and in this modified example, the direction of the optic axis of the birefringent material 13A on the surface of incidence of light is defined as a 0° direction (a left-to-right or right-to-left direction in FIG. 8). Since linearly polarized light that is polarized at 90° (in a direction perpendicular to the surface of the sheet of paper in FIG. 8) is an ordinary ray of the birefringent material 13A, the object light $L_{OBJ}$ is made to be linearly polarized light that is polarized at 90° and is made to travel toward the image sensor 5. Linearly polarized light that is polarized at 0°, which is an extraordinary ray, is referred to as reference light $L_{Ref}$a, $L_{Ref}$b.

Figure 8:
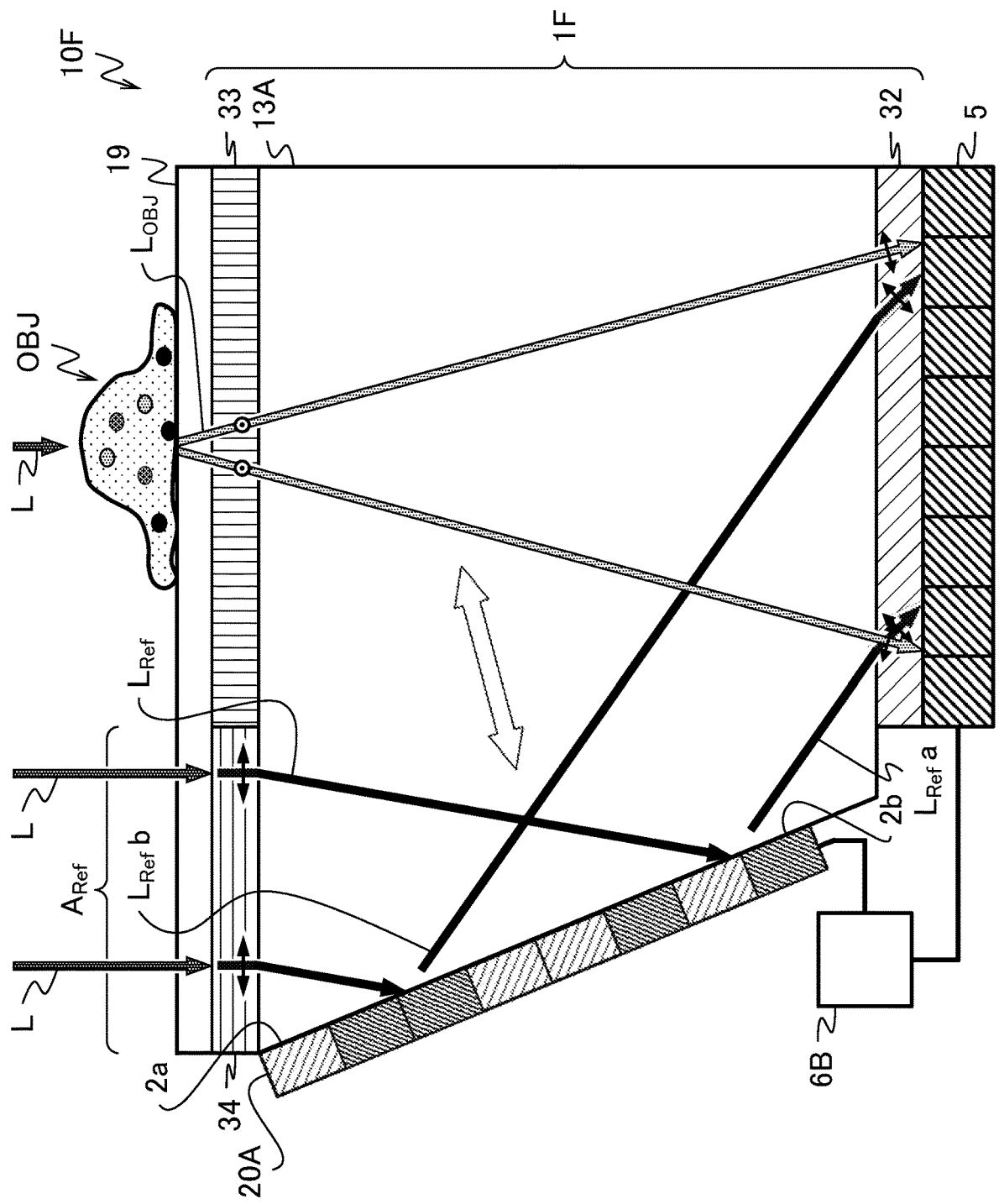
FIG. 8 is a sectional view schematically illustrating a configuration of a hologram recording device that includes a light interference generator according to a modification example of the third embodiment of the present invention.

Further, in the present modification, the birefringent material 13A causes an extraordinary ray (light $L_{Ref}$) of light L that enters the reference light incidence region $A_{Ref}$ to be incident on the spatial optical phase modulator 20A and causes the reflected reference light $L_{Ref}$a, $L_{Ref}$b to travel obliquely downward by being tilted toward the object light incidence region so that the reflected reference light $L_{Ref}$a, $L_{Ref}$b falls on the image sensor 5. For this purpose, the birefringent material 13A connects a side surface on the reference light incidence region $A_{Ref}$ side to a surface of incidence and output of light of the spatial optical phase modulator 20A. The side surface of the birefringent material 13A that is a connecting surface with the spatial optical phase modulator 20A is a surface that is not parallel to the surface of incidence of light (horizontal plane). That is, said side surface is a vertical surface or an inclined surface, and is designed based on a traveling direction of the light $L_{Ref}$ and reference light $L_{Ref}$a, $L_{Ref}$b. To be more specific, when an angle of refraction of the extraordinary ray of the birefringent material 13A is expressed as φ (0°<φ<90°) and a transmission angle (an angle of incidence to the polarizing plate 32) of the extraordinary ray reflected by the spatial optical phase modulator 20A is expressed as α (0°<α<90°), an inclination angle of the connecting surface with the spatial optical phase modulator 20A with respect to the surface of incidence of light is expressed as (90°+φ/2−α/2). In FIG. 8, α>φ is satisfied, and in this case, the side surface of the birefringent material 13A on a side of the reference light incidence region $A_{Ref}$ is an inclined surface whose outer surface is directed obliquely downward. In order to refract the extraordinary ray of the vertically incident light L toward the spatial optical phase modulator 20A, the optic axis of the birefringent material 13A is tilted in a thickness direction (direction of incidence of the light L). Further, in order to align the optical path length of the light $L_{Ref}$ ($L_{Ref}$a, $L_{Ref}$b) in the birefringent material 13A, a direction of the optic axis of the birefringent material 13A is set so that the angle of incidence and the angle of reflection of the extraordinary ray to the spatial optical phase modulator 20A become equal (specular reflection). Here in the present embodiment, the birefringent material 13A is assumed to be a positive crystal, and the optic axis is tilted downwards from the object light incidence region side to the reference light incidence region side $A_{Ref}$.

Further, the birefringent material 13A is designed with a length in the 0° direction of the reference light incidence region $A_{Ref}$ so that the reference light $L_{Ref}a$, $L_{Ref}b$ is incident on the entire imaging surface of the image sensor 5. In one or more embodiments, $\alpha > \varphi$ is satisfied, and in this case, the length in the 0° direction of the reference light incidence region $A_{Ref}$ may be shorter than that of the object light incidence region, and may be made shorter as the transmission angle $\alpha$ is set larger. Further, as the transmission angle $\alpha$ is set larger, the thickness of the birefringent material 13A may be made smaller.

Spatial Optical Phase Modulator

The spatial optical phase modulator 20A may have the configuration described in the modified example of the first embodiment, and in this modified example, the spatial optical phase modulator 20A shifts a phase of linearly polarized light that is polarized at 0° which is an extraordinary ray in the birefringent material 13A. Further, in this modification example, as described above, the surface of incidence and output of light of the spatial optical phase modulator 20A is connected to the side surface of the birefringent material 13A on a side of the reference light incidence region $A_{Ref}$ and is arranged in a vertical or inclined manner. As shown in FIG. 8, the spatial optical phase modulator 20A may be configured so that it is not provided on the entire side surface of the birefringent material 13A on the reference light incidence region $A_{Ref}$ side. In one or more embodiments, the spatial optical phase modulator 20A is designed based on an inclination angle of the surface of incidence and output of light, an exit angle of the extraordinary ray of the birefringent material 13A, and a length of the image sensor 5 in the 0° direction so that all the light incident on the image sensor 5 from the reference light incidence region $A_{Ref}$ side is projected from the spatial optical phase modulator 20A.

Polarizing Plate

The polarizing plate 32 and polarizing plate 33 have the same respective configurations as the polarizing plate 32 and polarizing plate 33 of the light interference generator 1E according to the above-described embodiment. The polarizing plate 34 is provided on the light incidence side of the birefringent material 13A as necessary with a direction of the transmission axis set to 0° so that, of the light L that enters the reference light incidence region $A_{Ref}$, light other than the reference light $L_{Ref}a$, $L_{Ref}b$, in other words linearly polarized light that is polarized at 90° which is an ordinary ray of the birefringent material 13A, is prevented from reaching the image sensor 5.

Hologram Recording Method

A hologram recording method of the hologram recording device 10F will be described with reference to FIG. 8. Similar to the embodiment shown in FIG. 7, when the light interference generator 1F is vertically irradiated with light L that is parallel light, the object OBJ is irradiated with a part of the light L, and object light $L_{OBJ}$ from the object OBJ enters the light interference generator 1F and becomes linearly polarized light that is polarized at 90° after passing through the polarizing plate 33. When the object light $L_{OBJ}$ that has been linearly polarized at 90° enters the birefringent material 13A, because the object light $L_{OBJ}$ is an ordinary ray, the object light $L_{OBJ}$ travels without being affected by the direction of the optic axis of the birefringent material 13A and reaches the polarizing plate 32. Light L that is incident on the reference light incidence region $A_{Ref}$ on the other hand, is transmitted through the polarizing plate 34 and becomes light $L_{Ref}$ that is linearly polarized at 0°. When the light $L_{Ref}$ enters the birefringent material 13A, because the light $L_{Ref}$ is an extraordinary ray, it is refracted so as to approach the optic axis direction and becomes incident on the spatial optical phase modulator 20A and then reflected. The phase of light $L_{Ref}$ that is reflected by the spatial optical phase modulator 20A changes by a shift amount that is different for each of the cells (phase shifters) 2a and 2b, and changes into light waves (reference light) $L_{Ref}a$ and $L_{Ref}b$ having different phases. Each of the reference light $L_{Ref}a$ and $L_{Ref}b$ forms a spherical wave. Further, because the phase shifters 2a and 2b have wavelength dependence, two light waves whose phases have changed by two shift amounts are formed for each wavelength range of colors R, G, and B. The reference light $L_{Ref}a$ and $L_{Ref}b$ that is emitted from the spatial optical phase modulator 20A tilts downward toward the object light incidence region and travels downward and reaches the polarizing plate 32.

Both the object light $L_{OBJ}$ and the reference light $L_{Ref}a$ and $L_{Ref}b$ become linearly polarized light that is polarized at 45° by the polarizing plate 32. As in the above-described embodiment, at the imaging surface of the image sensor 5, the object light $L_{OBJ}$ and reference light $L_{Ref}a$ of the same wavelength range and the object light $L_{OBJ}$ and reference light $L_{Ref}b$ of the same wavelength range respectively form interference fringes, and two patterns for each of the colors R, G, and B totaling six patterns overlap each other. The image sensor 5 collectively captures an image of the interference fringes of these six patterns and records them as a multiplex hologram. Further, the spatial optical phase modulator 20A changes the amount of phase shift of the reference light $L_{Ref}a$ and $L_{Ref}b$ by switching the magnitude of applied voltage with the computer 6B, and as a result, the pattern of the interference fringes changes. At the same time, the image sensor 5 again collectively captures an image of six patterns of interference fringes and records them as a multiplex hologram.

Similar to the hologram recording device 10E according to the above-described embodiment, the hologram recording device 10F may include the light shielding plate 18 (see FIG. 5) of the modification of the first embodiment in the object light incidence region (on the polarizing plate 33) of the surface of incidence of light of the light interference generator 1F. Further, in the light interference generator 1F, the birefringent material 13A may include layers of two or more birefringent materials in the same manner as the birefringent material 13 of the above-described embodiment. However, the spatial optical phase modulator 20A is connected to a side surface of one of the two or more birefringent materials. Further, the light interference generator 1F may be configured without the polarizing plate 33. Further, the light interference generator 1F may be configured without the polarizing plate 34. In this case, the light interference generator 1F is configured so that linearly polarized light that is polarized at 90° of all the light L that enters the reference light incidence area $A_{Ref}$ is projected from the birefringent material 13A to the outside of the imaging surface of the image sensor 5. Further, the light interference generator 1F may include a phase modulation device 21 instead of the spatial optical phase modulator 20A, and in this case, the phase modulation device 21 is a reflection type, with one of the electrode films of a liquid crystal element being a metal electrode.

Although embodiments for implementing a light interference generator and a hologram recording device according to the present invention has been described above, the present invention is not limited to these embodiments, and various modifications may be made within the scope of the claims.

REFERENCE SIGNS LIST 10, 10A, 10B, 10C, 10D, 10E, and 10F Hologram recording device
1, 1B, 1C, 1D, 1E, 1F Light interference generator
11, 11A First birefringent material
12, 12A Second birefringent material
13, 13A Birefringent material (first birefringent material)
18 Light shielding plate
20, 20B Phase shifter array (phase modulator)
20A Spatial optical phase modulator (phase modulator)
21 Phase modulation device (phase modulator)
22 Quarter-wave plate
2a, 2b Phase shifter
30 Polarizer array
31 Polarizing plate
32 Polarizing plate (polarizer)
33 Polarizing plate
34 Polarizing plate
3a, 3b Polarizer
40 Color filter array
41, 42 Filter
5 Image sensor
6, 6A, 6B Computer
7, 7A Light source

The invention claimed is:

1. A light interference generator comprising:
a first birefringent material;
a phase modulator configured to spatially, temporally, or spatially and temporally divide a polarization component whose polarization direction is parallel to or orthogonal to an optic axis of the first birefringent material to change a phase difference in two or more ways; and
a polarizer whose transmission axis is in a direction that is inclined with respect to the optic axis of the first birefringent material, wherein
the first birefringent material, phase modulator, and polarizer are arranged without a gap along a direction of travel of light,
the polarizer is disposed closer to a light exit side than the first birefringent material and the phase modulator, and
a surface of exit of light of the light interference generator is attached to a surface of incidence of light of an image sensor.

2. The light interference generator according to claim 1, wherein the phase modulator includes wavelength dependence.

3. A light interference generator comprising:
a first birefringent material; and
a polarizer array including a two dimensional arrangement of a plurality of polarizers whose transmission axes are in different directions to each other, wherein
the first birefringent material and the polarizer array are arranged without a gap in this order starting from a side of incidence of light, and
a surface of exit of light of the light interference generator is attached to a surface of incidence of light of an image sensor.

4. The light interference generator according to claim 1, wherein
the phase modulator is configured to reflect and output incident light, and
a surface of the first birefringent material that is neither parallel to a surface of incidence of light of the first birefringent material nor to a surface of exit of light of the first birefringent material is connected to a surface of incidence and output of light of the phase modulator.

5. The light interference generator according to claim 1, further comprising:
a second birefringent material whose optic axis is perpendicular to the optic axis of the first birefringent material, wherein
the second birefringent material is connected to a surface of exit of light of the first birefringent material or is disposed closer to a light incidence side than the first birefringent material.

6. A hologram recording device comprising:
an image sensor; and
the light interference generator according to claim 1, the light interference generator being attached to the surface of incidence of light of the image sensor, wherein
the light interference generator is configured to generate two light waves whose phases are different from each other from an incident light wave, and the image sensor is configured to record interference fringes that are formed from the two light waves as a hologram.

7. The light interference generator according to claim 3, further comprising:
a second birefringent material whose optic axis is perpendicular to the optic axis of the first birefringent material, wherein
the second birefringent material is connected to a surface of exit of light of the first birefringent material or is disposed closer to a light incidence side than the first birefringent material.

8. A hologram recording device comprising:
an image sensor; and
the light interference generator according to claim 3, the light interference generator being attached to the surface of incidence of light of the image sensor, wherein
the light interference generator is configured to generate two light waves whose phases are different from each other from an incident light wave, and the image sensor is configured to record interference fringes that are formed from the two light waves as a hologram.

* * * * *